(12) United States Patent
Haffizulla et al.

(10) Patent No.: US 12,086,896 B2
(45) Date of Patent: Sep. 10, 2024

(54) SYSTEMS AND METHODS FOR MENTORING STUDENTS AND FACILITATING THEIR ENTRY INTO HEALTHCARE PROFESSIONS

(71) Applicant: NOVA SOUTHEASTERN UNIVERSITY, Fort Lauderdale, FL (US)

(72) Inventors: Farzanna S. Haffizulla, Fort Lauderdale, FL (US); Anjali Ramoutar, Fort Lauderdale, FL (US); Vejendra Ammar, Fort Lauderdale, FL (US); Hemangi Rajpal, Fort Lauderdale, FL (US); Anam Ahmed, Fort Lauderdale, FL (US)

(73) Assignee: Nova Southeastern University, Fort Lauderdale, FL (US)

( * ) Notice: Subject to any disclaimer, the term of this patent is extended or adjusted under 35 U.S.C. 154(b) by 154 days.

(21) Appl. No.: 17/702,906

(22) Filed: Mar. 24, 2022

(65) Prior Publication Data
US 2022/0215494 A1 Jul. 7, 2022

Related U.S. Application Data

(63) Continuation-in-part of application No. PCT/US2020/052177, filed on Sep. 23, 2020.
(Continued)

(51) Int. Cl.
*G06Q 50/20* (2012.01)
*G09B 5/14* (2006.01)
*H04L 67/50* (2022.01)

(52) U.S. Cl.
CPC ..... *G06Q 50/2057* (2013.01); *G06Q 50/2053* (2013.01); *G09B 5/14* (2013.01); *H04L 67/535* (2022.05)

(58) Field of Classification Search
CPC .......... G06Q 50/2057; G06Q 50/2053; G06Q 50/22; G06Q 50/20; G09B 5/14; H04L 67/535
See application file for complete search history.

(56) References Cited

U.S. PATENT DOCUMENTS

2012/0329016 A1 12/2012 Kapoor et al.
2013/0031208 A1* 1/2013 Linton ................. G09B 7/02
709/217

(Continued)

FOREIGN PATENT DOCUMENTS

CN 109901894 A * 6/2019

OTHER PUBLICATIONS

International Preliminary Report on Patentability (IPRP) for PCT/US20/52177; dated Apr. 7, 2022.
(Continued)

*Primary Examiner* — Florian M Zeender
*Assistant Examiner* — Emily M. Kraisinger
(74) *Attorney, Agent, or Firm* — Fleit Intellectual Property Law; Paul D. Blanco; Jon Gibbons

(57) ABSTRACT

A computer-based system, and a computer-implemented method, mentors students, particularly women and ethnic and racial minorities, intending to enter healthcare professions. The system uses a gamified mobile-enabled web application (App) that serves as a visual and interactive dashboard populated with checklists, career support resources, strategies, tips, and a mentoring platform to educate, encourage, empower, and facilitate the entry of students into the healthcare professions.

15 Claims, 22 Drawing Sheets

Related U.S. Application Data

(60) Provisional application No. 62/905,133, filed on Sep. 24, 2019.

(56) References Cited

U.S. PATENT DOCUMENTS

2019/0188648 A1* 6/2019 Ruiz ................. G06Q 10/1053
2019/0222560 A1   7/2019 Ford et al.

OTHER PUBLICATIONS

Heidrick, Creating a Culture of Mentorship, Heidrick & Struggles International, Inc., pp. 1-16, © 2017.
Francis, Gamify your Apps to Increase User Interaction and Build Loyalty, Tech Republic (htts://www.techrepublic.com/blog/software-engineer/eight-ways-to-get-more-eyeballs-on-your-app/), Apr. 9, 2014.
International Search Report and Written Opinion for PCT/US20/52177; dated Dec. 22, 2020.

* cited by examiner

PTH 1

PTH 4

QVP 3

Mentor Forum

☰ Filters | TOP | 📍 Research ✕

🔍 Search Question or Type Keyword...

Question: Lorem ipsum dolor sit amet, consectetuer adipiscing elit?

⬆ 1065 | Tag Name | Tag Name | Tag Name | Tag Name

Answer: Vestibulum ante ipsum primis elementum, libero interdum auctor cursus, sapien enim dictum quam. Phasellus vehicula nonummy nunc...

👤 John Doe
Practicing Physician 2 days ago Collapse

Question: Lorem ipsum dolor sit amet, consectetuer adipiscing elit?

⬆ 989 | Tag Name | Tag Name | Tag Name | Tag Name

Answer: Vestibulum ante ipsum primis elementum, libero interdum auctor cursus, sapien enim dictum quam. Phasellus vehicula nonummy nunc...

👤 Jane Doe
Medical Student
Third Year 2 hours ago Collapse

PROFILE

James Arthur
Biology Teacher
🏛 University of Florida

DEMOGRAPHICS

| | |
|---|---|
| Gender | Female |
| Race/Ethnicity | Asian, Indian |
| Describe your race/ethnicity (Optional) | |
| First generation student? ⓘ | Yes |

EDUCATIONAL INTEREST

| | |
|---|---|
| Major | Neuroscience |
| Minor | South Asian Language |
| Career Specialization | Nanotechnology |

STEM EXTRACURRICULARS

- Shadowing
- Research
- Honor Science
- Internship

OUTSIDE INTEREST

| | |
|---|---|
| Interest | Dance, Government Student |

Resources  Mentor  Pathway  Checklist  Profile

*FIG. 11*

SYSTEMS AND METHODS FOR MENTORING STUDENTS AND FACILITATING THEIR ENTRY INTO HEALTHCARE PROFESSIONS

CROSS-REFERENCE TO RELATED APPLICATIONS

This application claims priority from and is related to Patent Cooperation Treaty Application PCT/US2020/052177, filed on Sep. 23, 2020, which in turn claims the benefit of U.S. Provisional Patent Application No. 62/905,133, filed on Sep. 24, 2019. The entire written description and drawings of each of these applications are hereby incorporated by reference into the present application.

FIELD OF THE INVENTION

The present application generally relates to computer technologies, and more specifically to electronic systems that facilitate connections between people and between people and sources of information, and most particularly to mobile-enabled web applications (Apps) designed for mentoring students and facilitating their entry into the healthcare professions.

BACKGROUND

Few would deny the powerful role that mentorship and career guidance play in providing opportunities for personal and professional development. In the corporate world, mentorship is generally a positive and impactful experience, particularly for women and ethnic and racial minorities. *Creating a Culture of Mentorship* by Heidrick & Struggles International, Inc. 2017; accessed from the website of Heidrick on Sep. 20, 2019.

The instant inventors want to bring mentorship and career guidance to students, particularly minority students, seeking careers in healthcare. The inventors have noticed an ethnic maldistribution of physicians and other healthcare providers in the United States. This maldistribution is correlated with lapses in care, culturally insensitive medical advice, and instances of unconscious bias. Studies suggest that increasing clinician workforce diversity will have profound effects on access to health care, patient trust, and medical advice, i.e., increases of culturally appropriate medical advice that addresses health disparities. Often, however, minority students lack the resources they need to successfully embrace a career in healthcare.

BRIEF SUMMARY

A personalized platform can facilitate minority student access to healthcare education mentors and resources. For example, the inventors have developed a computer application, currently named the M3 App (Mentoring Minorities in Medicine), which in certain embodiments can comprise a mobile-enabled web application, designed for mentoring students and facilitating their entry into the healthcare professions.

In accordance with various embodiments of the present disclosure, a method for mentoring students for entry into a healthcare profession comprises: a) providing a smartphone mobile platform application ("the app") for exchanging information from individual student users and individual mentor users ("the data") through a network connection to one or more servers ("the server"); b) persisting the data in one or more databases ("the database") accessible by the server, the data stored in a standardized format that can be accessed using the app so that the data can be updated in real time through a graphical user interface of the app, and so that the data can be queried by other student users, other mentor users, and administrators; c) the app providing a mentor interface for enabling (i) asking questions by student users, (ii) answering of the questions by mentor users, (iii) indexing using subject matter tags of the questions and answers within the database so that individual students can search for questions asked by other student users and answers provided by mentor users using a plurality of subject matter tags, the questions and answers forming part of the data; d) the app providing a task interface that (i) displays predefined tasks to be completed that are relevant to entry into the healthcare profession, (ii) displays a task creation interface with which individual student users can create their own new tasks that are relevant to entry into the healthcare profession and which are displayed together with the predefined tasks and which are persisted in the database, and (iii) a check-off interface with which individual students can indicate completion of predefined and new tasks, the checked-off state of tasks being persisted in the database, the task information forming part of the data; e) the app coordinating with the server to transmit alerts to individual students relating to new information resources which are relevant to tasks an individual student user has completed, including displaying links to the new resources, the resource information forming part of the data; and f) the server compiling and analyzing the data to provide information through an administration portal relating to accountability of students including frequency of use of the app and use of checklists.

In various embodiments, the data is standardized through the use of a schema driven querying server; the compiled and provided information includes information pertaining to students who have used the app and who have subsequently entered into a healthcare profession; the server provides an Application Programming Interface ("API") for accessing the data in the standardized format; the data is persisted using an S3 style storage network; the server measures engagement by tracking the number of times the app has been downloaded; and/or the server measures engagement by tracking the number of downloads of the app, the number of student users creating accounts, and the number of student users creating their own new tasks.

In certain embodiments, the server is configured to scale dynamically to maintain real time exchange of information between a plurality of running instances of the app and the server as the number of running instances of the app increases; the exchanged information includes information pertaining to a type of minority status of individual student users, and the new information resources are relevant to the type of minority status of individual student users; the new information resources include information relating to at least one of scholarships and aptitude testing; the task interface forms a pathway with spaced apart markings pertaining to tasks which are successively completed; and/or the spaced apart markings are graphical icons, and wherein the last completed task is represented with a predetermined icon.

In other variations thereof, after a predetermined number of tasks are completed, a new information resource becomes available that represents a reward; the mentor interface enables ranking of mentor users by student users; the mentor interface enables filtering by category to limit the display of questions answered; the mentor interface enables filtering by subject matter tag to limit the display of questions answered; and/or the app includes a profile interface wherein individual computer users can exchange data relating to personal information and personal goals that is useable by the server to customize new information resources provided.

BRIEF DESCRIPTION OF THE SEVERAL VIEWS OF THE DRAWINGS

A more complete understanding of the present invention may be obtained by references to the accompanying drawings when considered in conjunction with the detailed description herein. The embodiments illustrated in the drawings are intended only to exemplify embodiments of the invention and should not be construed as limiting the invention to the illustrated embodiments.

FIGS. 4A to 4E are illustrations of checklist (CHK) screens 1-5, respectively.

FIGS. 5A to 5D are illustrations of task list (TSK) screens 1-4, respectively.

FIGS. 6A to 6C are illustrations of the question viewing portal (QVP) screens 1-3 of the Mentor Forum, respectively.

FIG. 6D depicts a QVP page of an iOS compatible app of the disclosure.

Figures 7A, 7B:
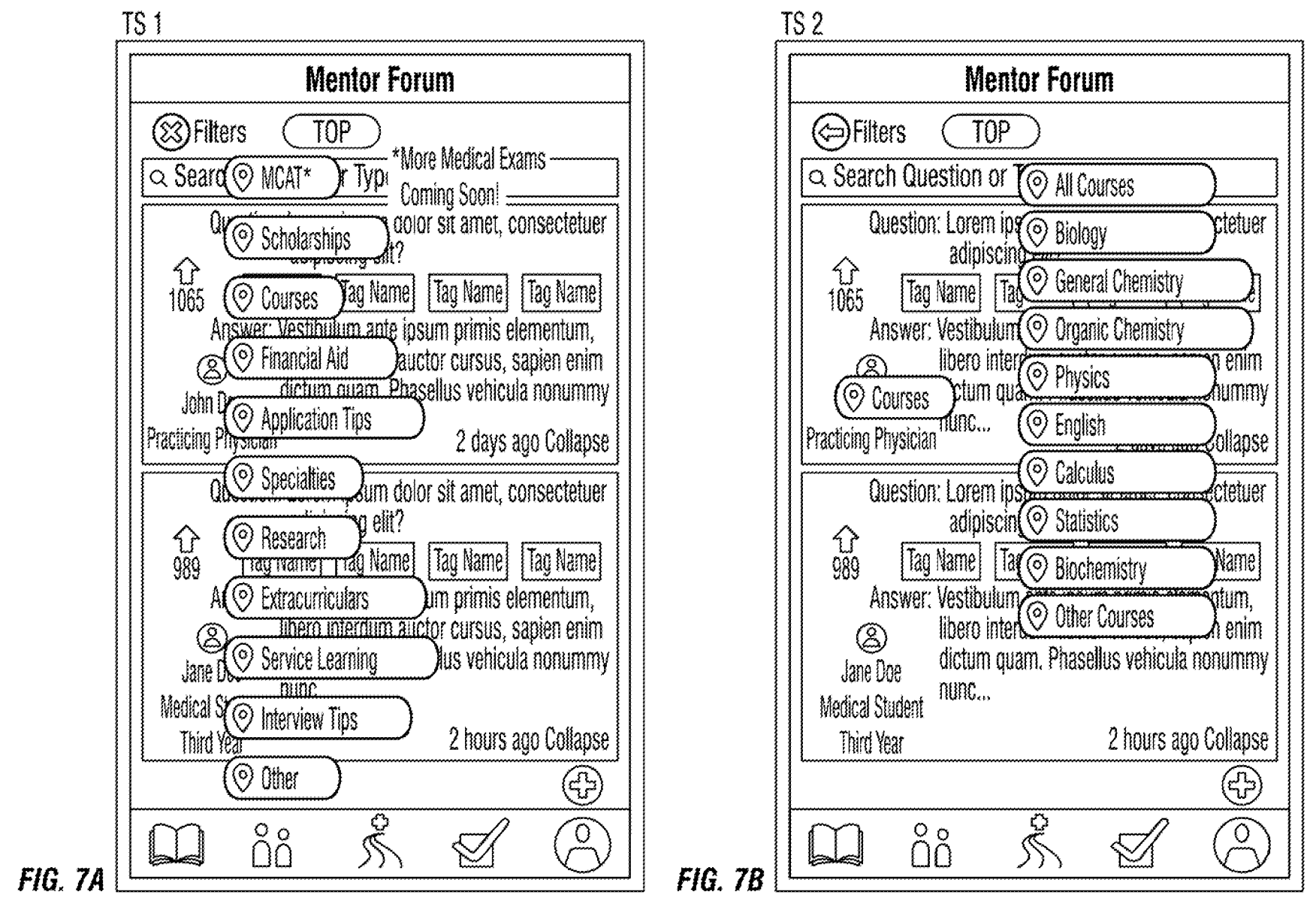
Figures 7C, 7D:
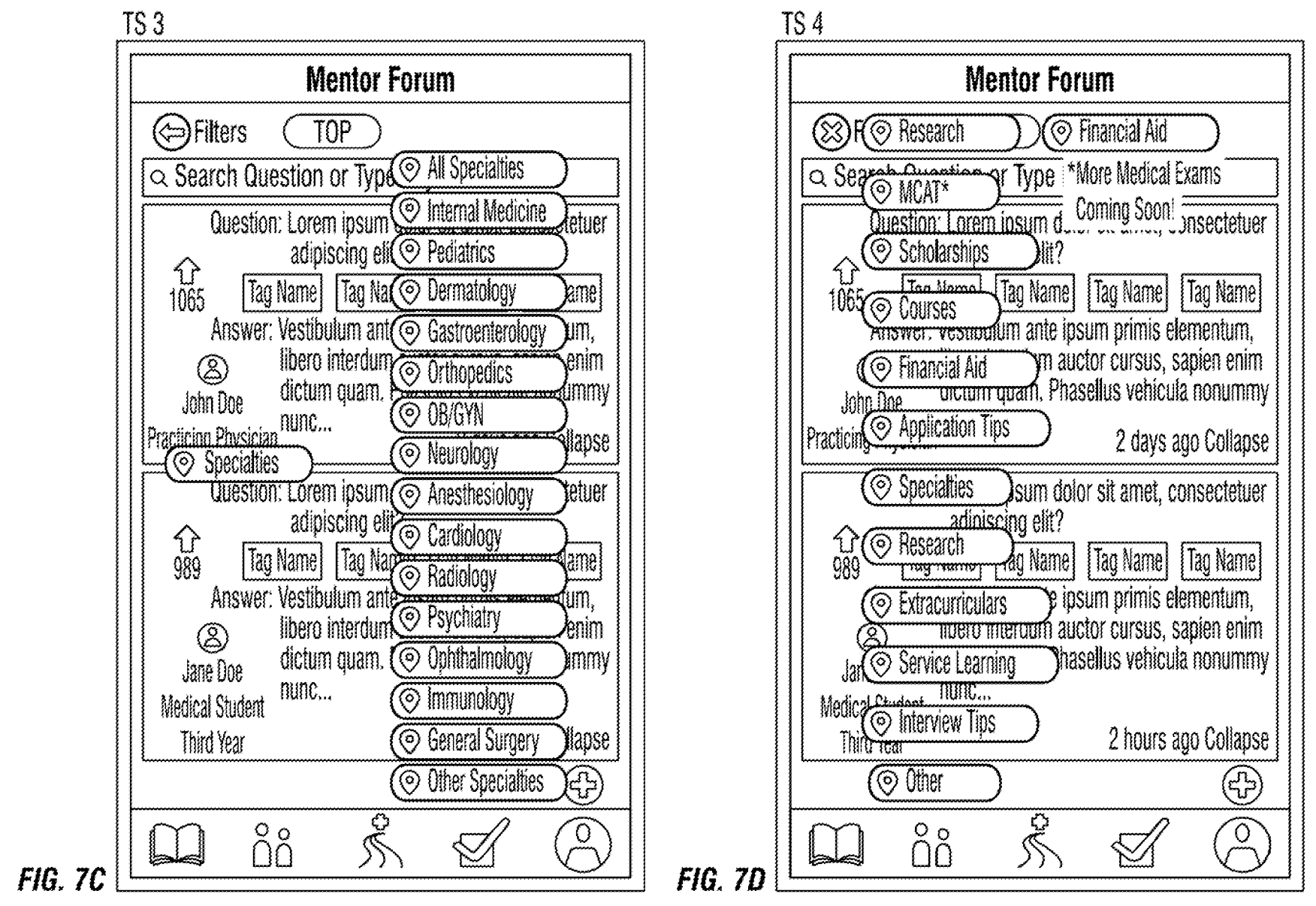

FIGS. 7A-D are illustrations of the tag (TS) screens 1-4 of the Mentor Forum, respectively.

Figures 8A, 8B:
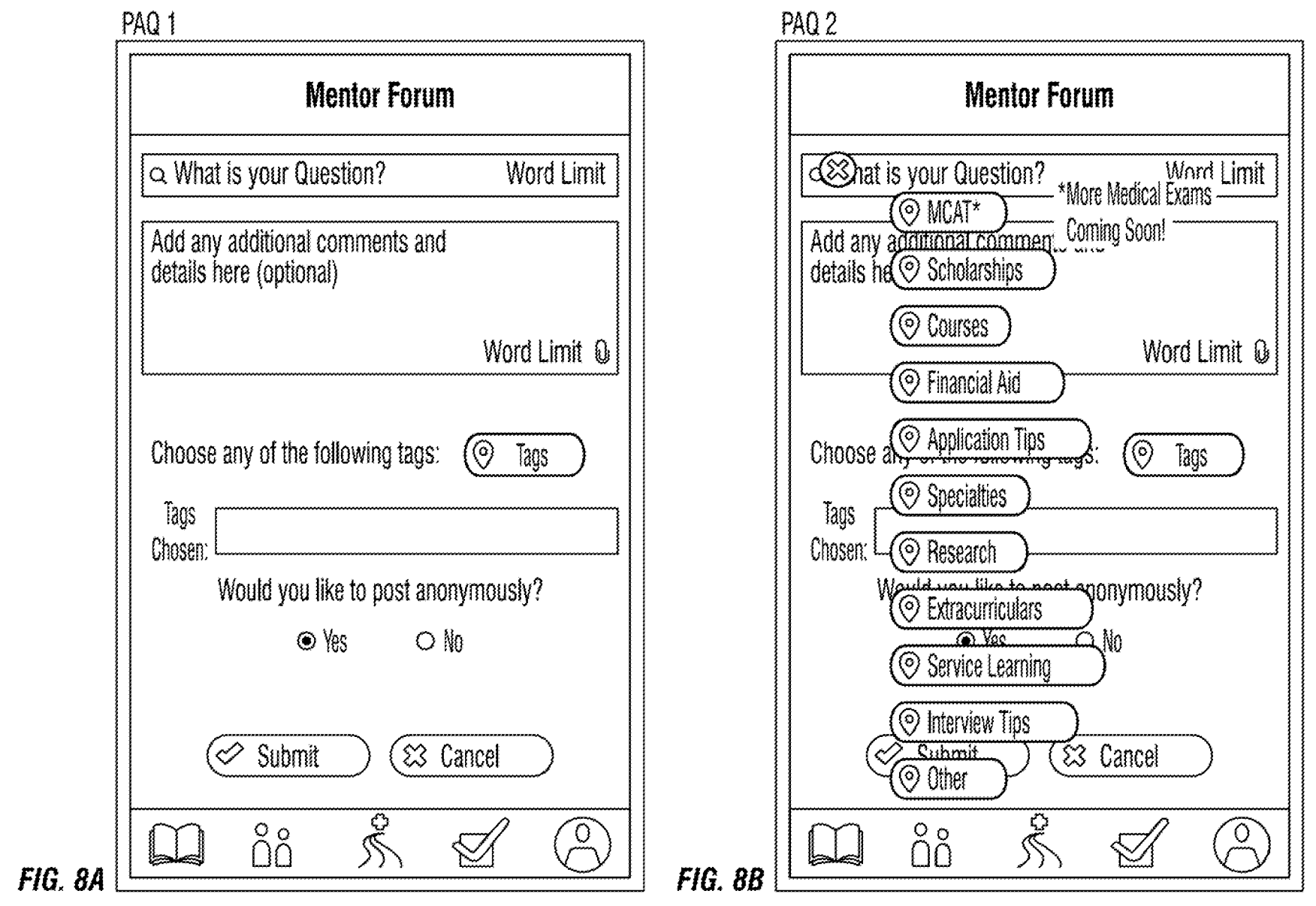
Figures 8C, 8D:
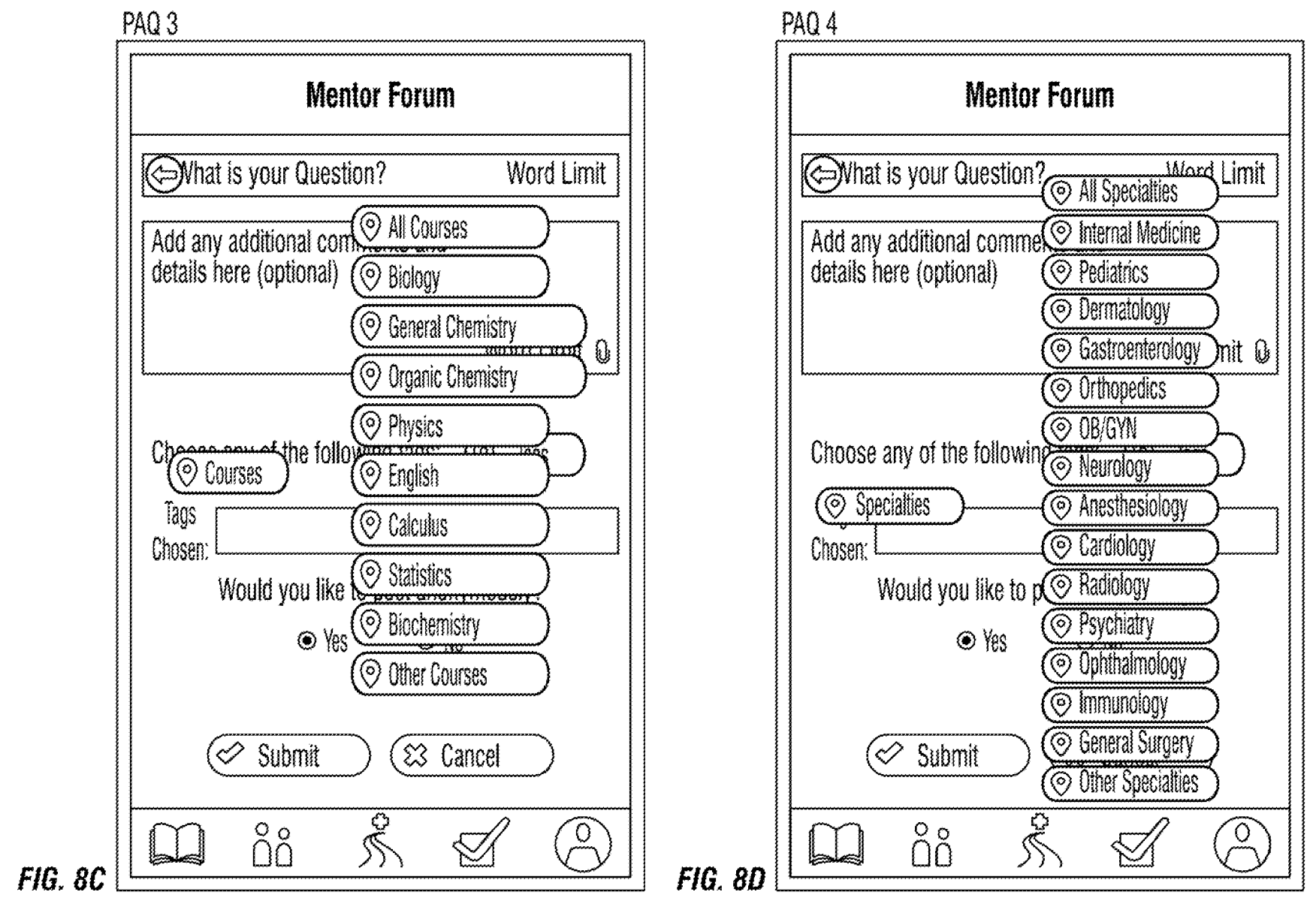

FIGS. 8A to 8D are illustrations of the posting a question (PAQ) screens 1-4 of the Mentor Forum, respectively.

Figures 9A, 9B:
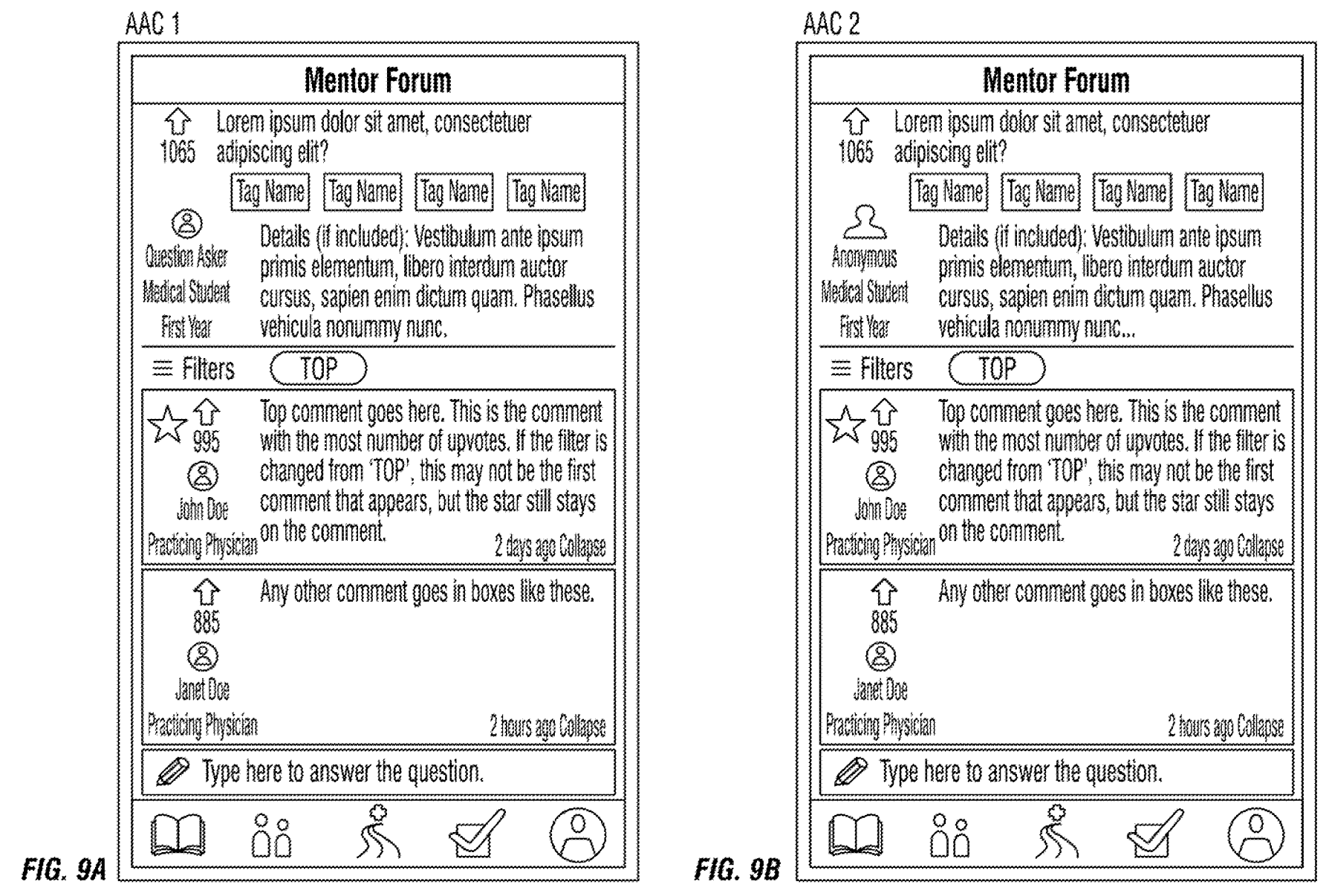
Figures 9C, 9D:
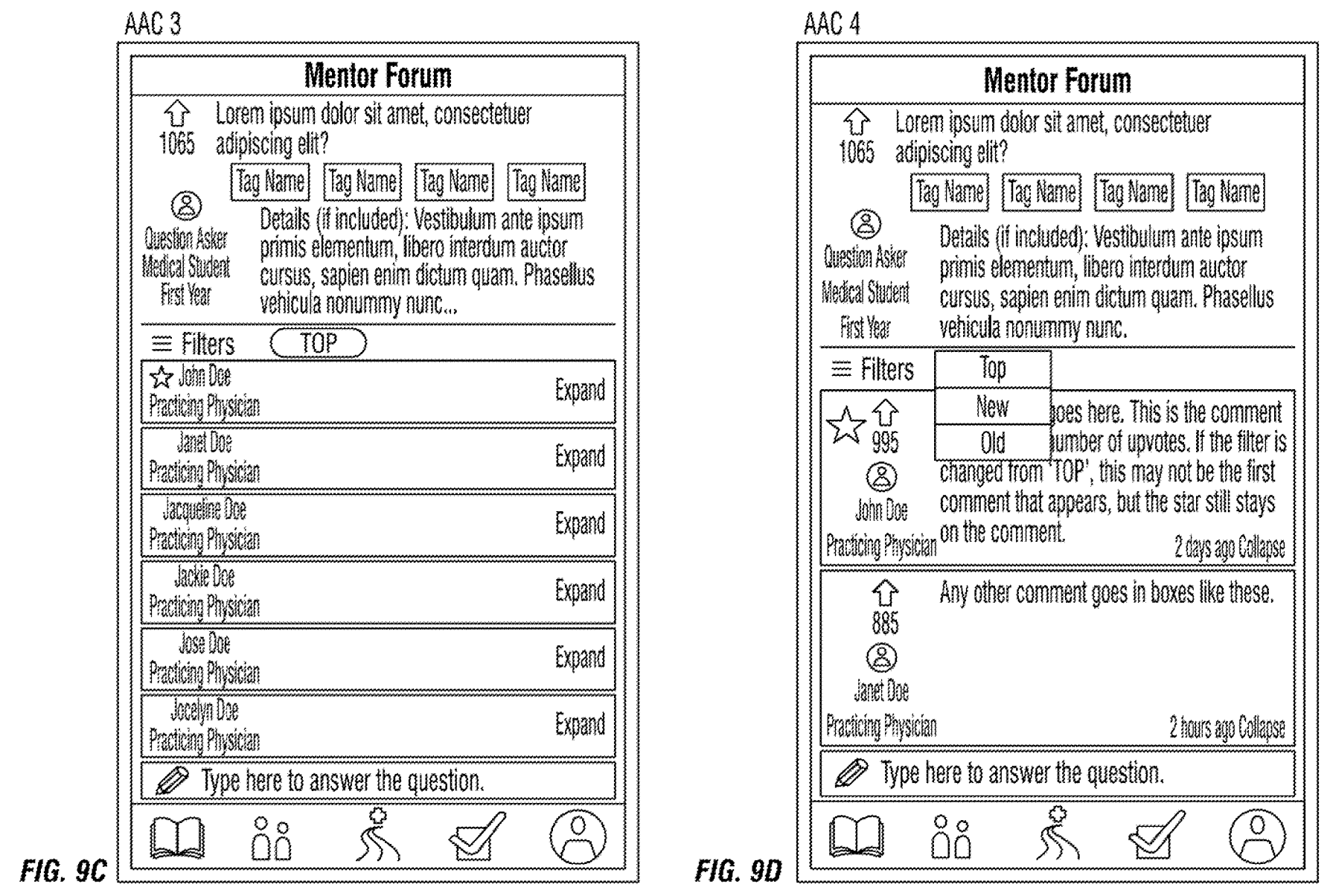

FIGS. 9A to 9D are illustrations of the answers and comments (AAC) screens 1-4 of the Mentor Forum, respectively.

FIG. 11 depicts a Profile page of an iOS compatible app of the disclosure.

DETAILED DESCRIPTION

Figure 1A:
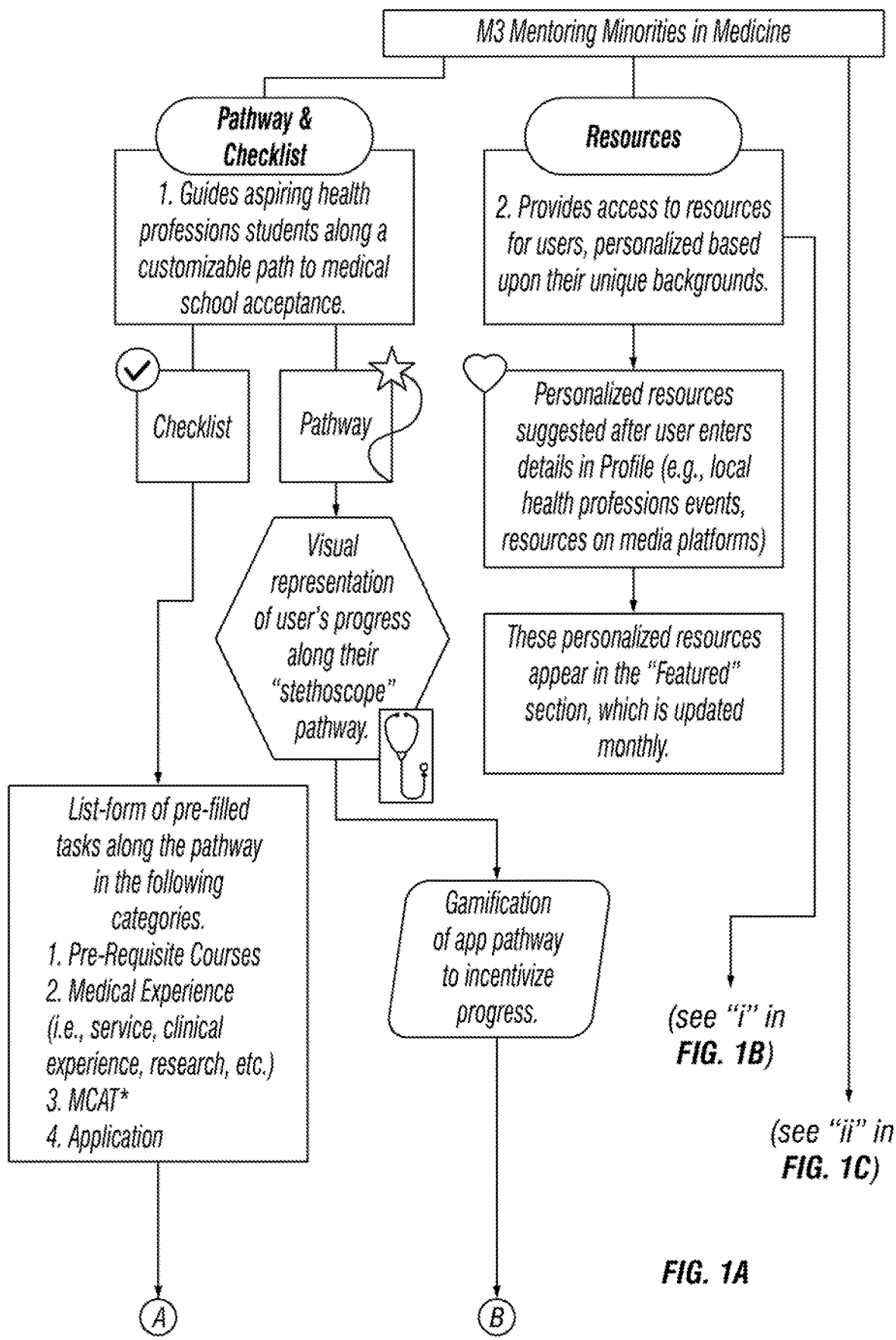
FIGS. 1A, 1B, and 1C, are block diagrams collectively displaying a schematic overview of the M3 (Mentoring Minorities in Medicine) App, according to various embodiments of the present invention.
Figure 1A:
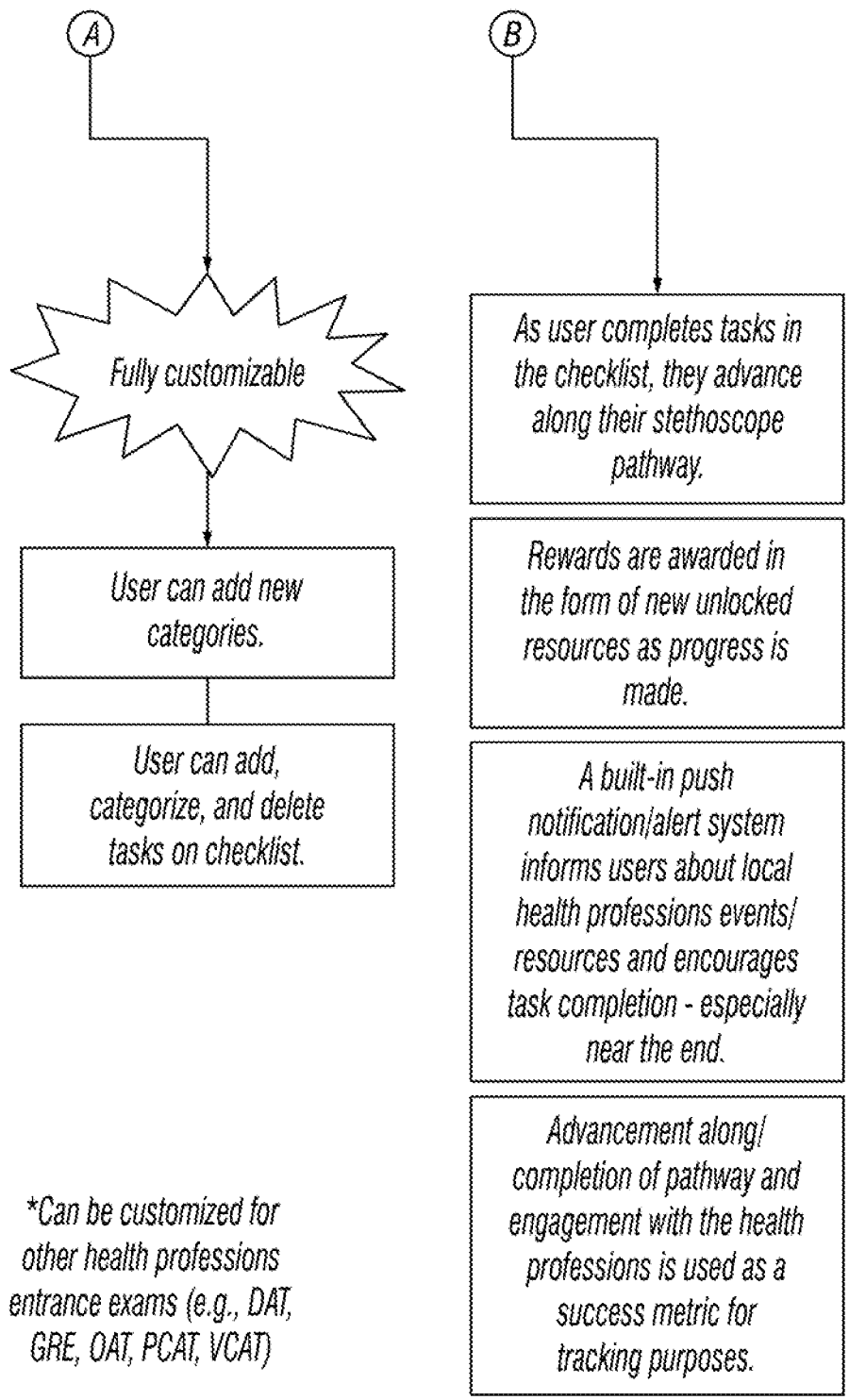
Figure 1B:
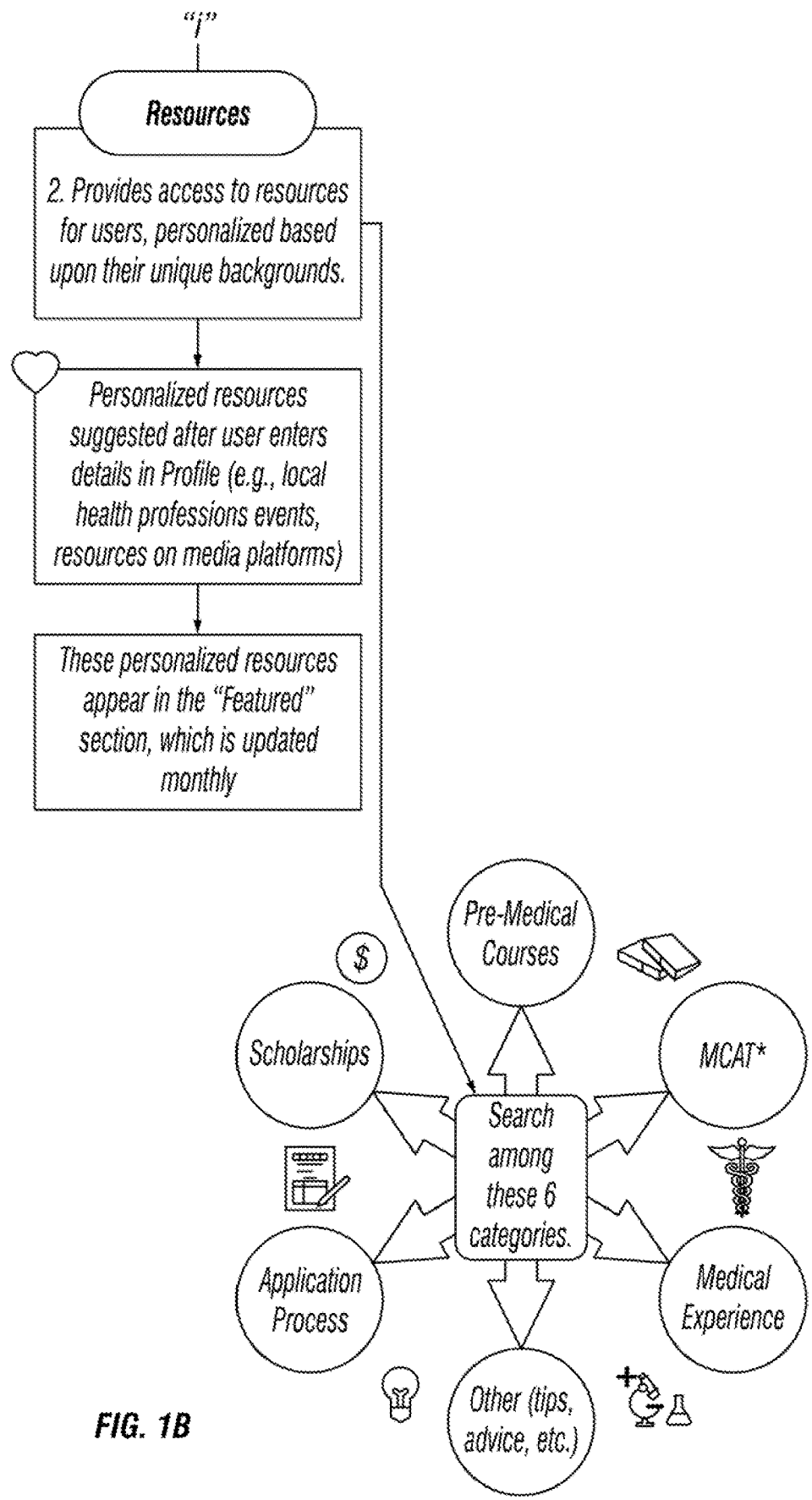
Figure 1C:
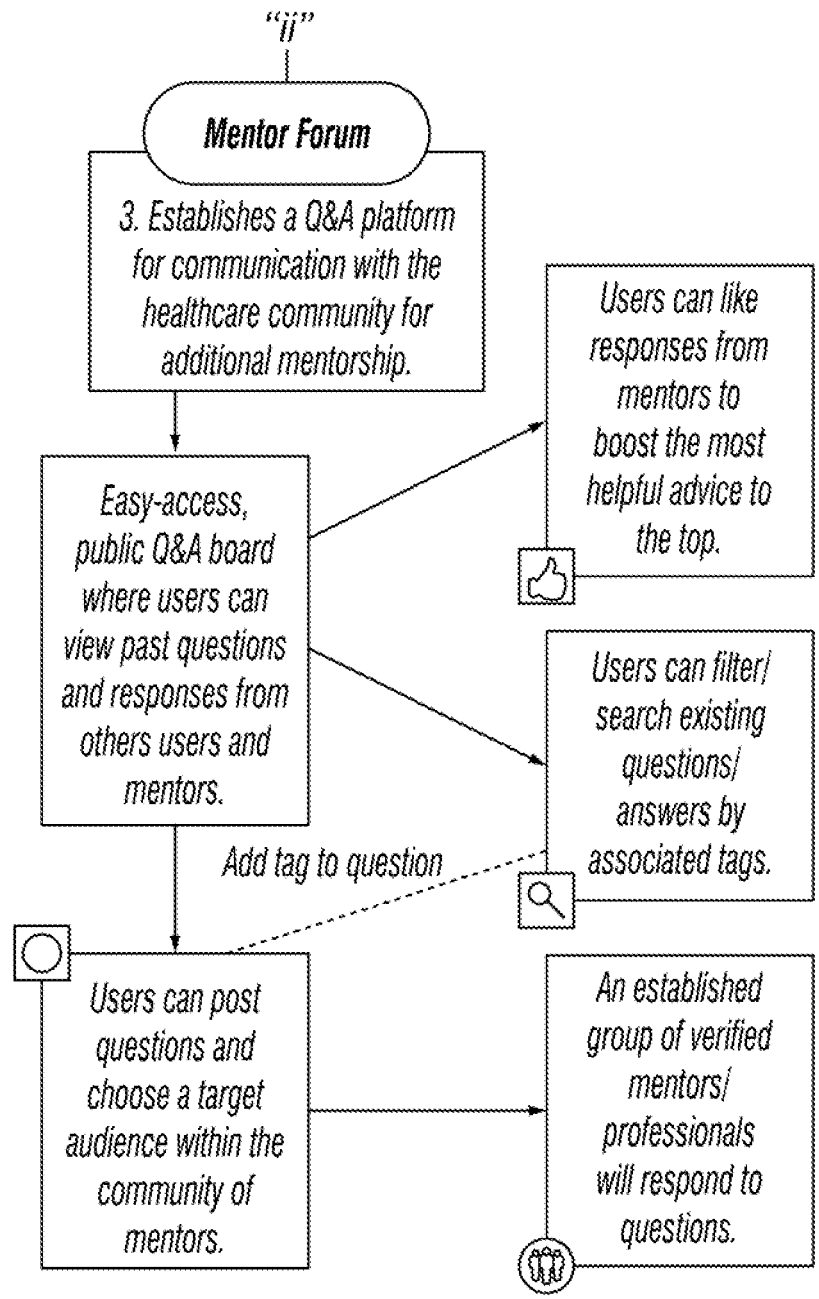

For the purpose of promoting an understanding of the principles of the invention, reference will now be made to embodiments illustrated herein and specific language will be used to describe the same. It will nevertheless be understood that no limitation of the scope of the invention is thereby intended. Any alterations and further modification in the described systems and methods for mentoring students and facilitating their entry into healthcare professions along with any further application of the principles of the invention as described herein, are contemplated as would normally occur to one skilled in the art to which the invention relates.

The M3 App (Mentoring Minorities in Medicine) of the disclosure provides a mentoring and guidance app for health careers coupling minority-specific specifications with a unique blend of services and resources. The app is customizable for a variety of healthcare careers and is exemplified herein by a non-limiting medical school model. The M3 App is specifically designed for minority students. However, any student pursuing a career in healthcare can benefit from use of the app.

The M3 App serves as a student's dashboard for their medical career path, connecting them with resources, serving as a source of accountability, and encouraging students by providing success stories and mentors who are minority medical students or practicing clinicians. Each student can create an individualized checklist for major milestones (for example, but not limited to completion of course prerequisites, take MCAT exam, and submit applications) to track their progress. The checklist tasks are visualized onto a pathway to serve as a progress bar, incentivizing students as they complete requirements and get closer to their goals. This app will also be an important source for carefully curated resources including, but not limited to, minority-related scholarships, application tips for minority students, and vetted information pertaining to test scores, deadlines, and other important material instrumental to a minority student's success. As noted, the app depicted herein is targeted to support careers in medicine but is expandable and configurable to include support for all careers in healthcare.

The main pathway/checklist features of the app can be gamified to engage and encourage users. As used herein "gamification" refers to the application of gaming techniques to traditionally non-gaming activities. See "Gamify your Apps to Increase User Interaction and Build Loyalty" by William J. Francis, 2014; accessed from the website of Tech Republic on Sep. 23, 2019. By gamifying the app, a user is incentivized to complete tasks on the checklist and thus advance along his/her personalized pathway. Advancement along the pathway rewards users by unlocking new resources. Further, the app can include a built-in push notification system to inform users of local health professions events and related resources.

In order to measure engagement, data can be tracked for number of app downloads, number of users signed up for an account, number of users regularly using checklists, and number of users that successfully enter medical school or other health profession.

The M3 App is provided for mobile platforms, such as iOS and Android. In order to have a common code base between the various platforms, enabling code reuse, the app can be built using a react native framework. This framework was developed by Facebook as an open source project allowing app development to be done using JavaScript. It is widely used in the industry and thus has a large community base for support and expansion. To persist information entered in the app, such as, but not limited to, checklist data, resources, and/or forums, the backend service can leverage Amazon Web Services (AWS) resources such as S3, dynamo db, lambda, and api gateway. These services will ensure that the app will be highly available and scale dynamically according to mobile traffic at any given time. To interact with the data layer of the application, GraphQL can be used versus REST. GraphQL is a schema driven querying service developed internally at Facebook and made open sourced in 2015. A schematic overview of the developmental/system architecture is shown in FIG. 2.

Figure 2:
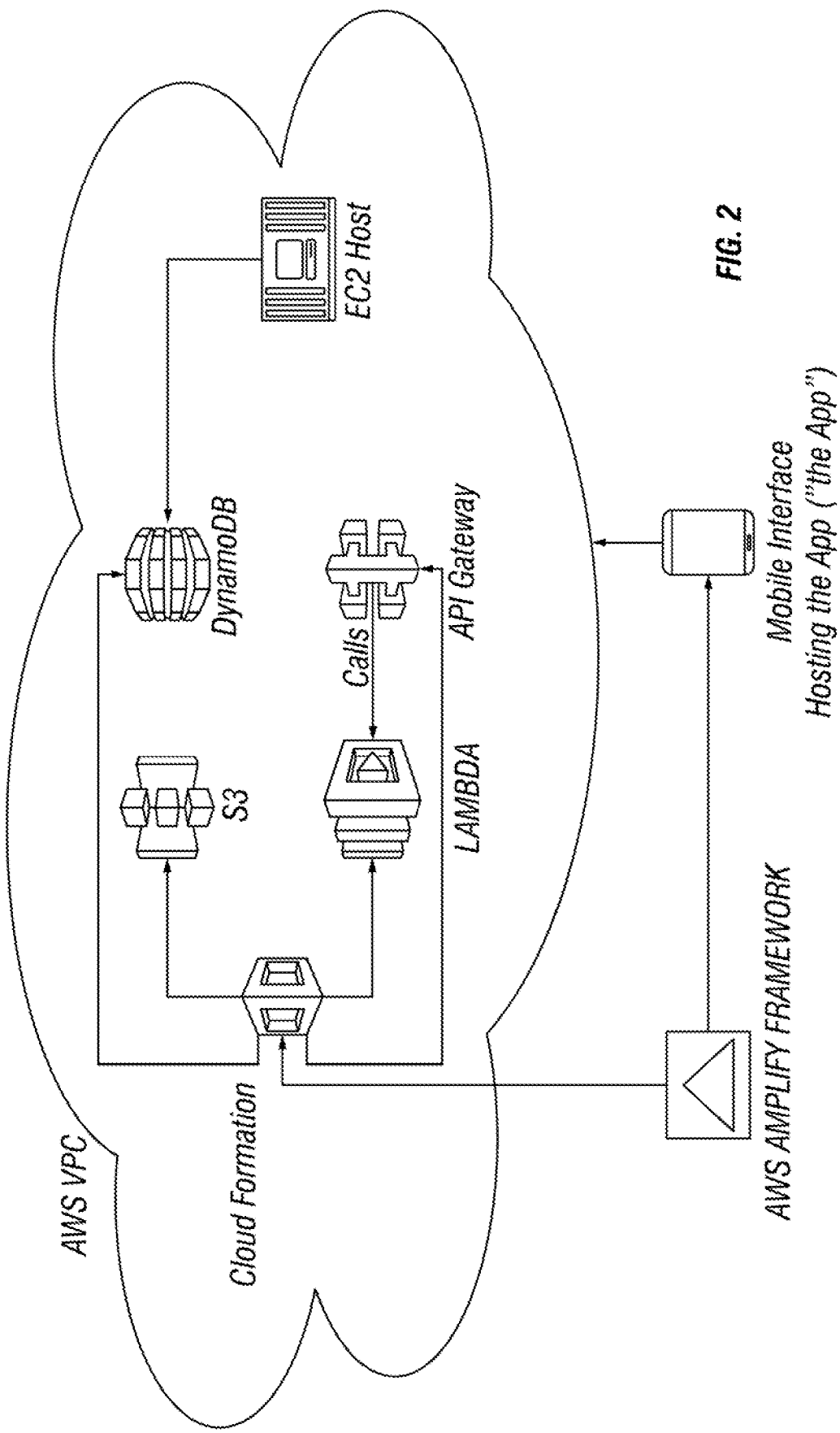
FIG. 2 is a schematic overview of an example developmental architecture for the M3 App.

With further reference to FIG. 2, in one embodiment, a scalable server backend can include an AMAZON WEB SERVICE ("AWS") VIRTUAL PRIVATE CLOUD ("VPC"). The Cloud Formation is an AWS Service that is responsible for creating and managing AWS resources. The reference S3 designates a virtually unlimited cloud storage server the follows the S3 server protocol; DynamoDB designates a NoSQL database used for the backend GraphQL services; Lambda designates serverless functions in the cloud used to process business logic; API Gateway designates a serving layer for the VPC that provides the endpoints clients will use to interact with the backend services, and which includes self managed scaling and load balancers; and EC2 Host designates the host for the administrative website for the app, where administrators can login to manage resources and view app analytics. The app communicates with the Cloud Formation using GraphQL, which is a data language that was developed to enable apps to fetch data from servers. It has a declarative, self-documenting style. In a GraphQL operation, the client specifies how to structure the data when it is returned by the server. This makes it possible for the client to query only for the data it needs, in the format that it needs it in. The AWS Amplify Framework provides an Amplify Command Line Interface (CLI) that manages the backend resources as well as provides front end libraries used by the app (see https://aws.amazon.com/amplify).

Figure 12:
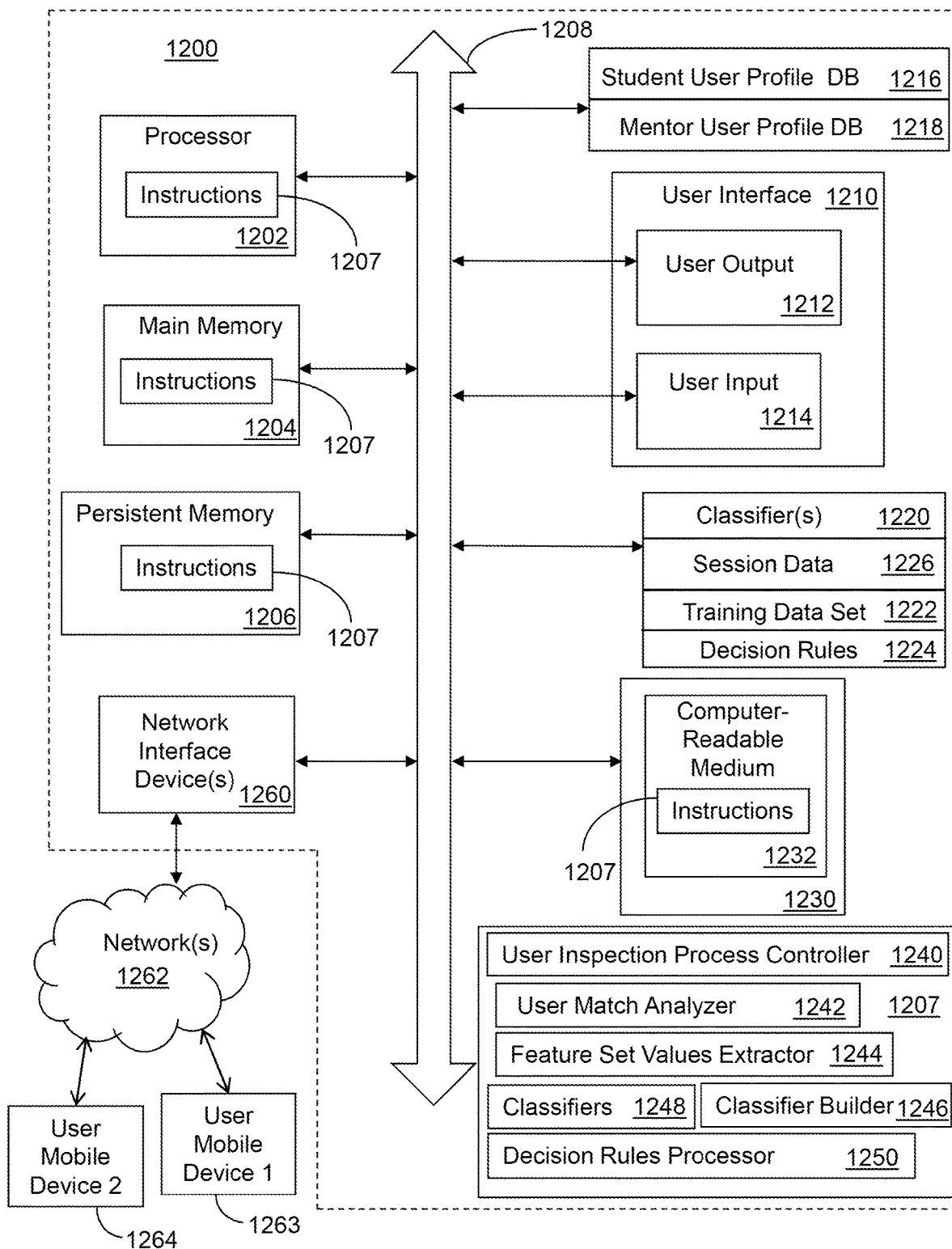
FIG. 12 is a block diagram illustrating an example of an information processing system suitable for use with systems and methods of the disclosure as shown in the previous figures, according to various embodiments of the invention.

Below will be discussed an example of an information processing system 1200 as illustrated in FIG. 12. The information processing system 1200, according to various embodiments, operating either alone or as part of a server backend, is suitable for use in various embodiments of system and method of the present invention. It should be noted, for example, that such an information processing system 1200 can comprise at least one server node operating in a cloud-based system which can comprise any one or more of a private cloud, a public cloud, or a hybrid cloud.

The example information processing system 1200 shown in FIG. 12 includes various components. A processor 1202 executes instructions 1207 that cause the information processing system 1200 to perform operations according to various embodiments of the invention. It should be understood that the information processing system 1200 can include a plurality of processors executing instructions 1207, according to various embodiments.

The processor 1202, in this example, is communicatively coupled with various other components of the information processing system 1200 via a system bus 1208. Main memory 1204 contains instructions 1207, which can include computer instructions, configuration parameters, and data used by the processor 1202. Persistent memory 1206 can store the instructions 1207 in persistent storage for processor 1202.

A user interface 1210 includes a user output interface 1212 and a user input interface 1214 for communicating with a user (e.g., an operator or other technical personnel) using the information processing system 1200. The user output interface 1212 can includes various output devices, such as a computer display device, indicator lights, a speaker that generates sound output to a user, or a data output interface device that can provide data and control signals to a user that comprises a computer system.

The user input interface 1214 can include various input devices such as a computer keyboard, mouse device, touch screen display, or a microphone that receives sound input signals from a user. The received sound signals, for example, can be converted to an electronic digital representation and stored in memory, and optionally can be used with voice recognition software executed by the processor 1202 to receive user input data and commands. The user input interface 1214 can include a data input interface device that can receive data and control signals from a user that comprises a computer system.

A student user profile database 1216 and a mentor user profile database 1218 can be communicatively coupled with the processor 1202. The processor 1202 interoperates with these databases 1216, 1218, to store user information records, which contain user information associated with individual mentor users or associated with individual student users, or both. The processor 1202 can also look-up user information from records stored in the databases 216, 218, to access user information according to various operations of the information processing system 1200.

The user information stored in these databases, according to various embodiments, is stored in a standard format. In certain embodiments, the remote user devices 1263, 1264, such as an iPhone, an Android phone, a PC, or a laptop PC, can locally store user information in a custom format compatible with the particular remote user device locally running a computer application. A computer application operating in the remote user device, such as a version of the M3 App which will be discussed more fully below, can locally present user information to a user of the device.

The user information is maintained and processed by the information processing system 1200 in a standard format in the centralized databases 216, 218. The information processing system 1200, in certain embodiments, accordingly converts user information between the standard format in the databases 216, 218, and the different (custom) formats used by different remote user devices 1263, 1264. This conversion operates both for receiving user information at the information processing system 1200 from a remote user device and for transmitting user information to the remote user device. In this way, the information processing system 1200 can process all user information in a standard data format, while maintaining compatibility (data format translation) for the user information that is communicated with remote user devices that can operate on the user information in a custom format suitable for the particular remote user device. This allows the system 1200 to interoperate with the remote user devices 1263, 1264, to enable an application, such as the M3 App, while maintaining data format compatibility with many different data formats of user information in respective many different remote user devices. The application (e.g., the M3 App) components running on the information processing system 1200 (e.g., operating as a server) using data in a standard data format can operate in coordination with application (e.g., M3 App) components running on remote user devices (e.g., on iPhones, Android phones, different types of PC's, different types of laptops, etc.) using and storing data in a custom data format, that can be different from the standard data format, based on compatibility of use and storage of the data in each remote user device, according to various embodiments. Additionally, application components running on the server 1200 can transmit (e.g., push over network(s), which might include wireless, wireline, or both types of networks) alert signals, data signals, control signals, or any combination of the signals, to the application components running in particular remote user device(s) selected from the various remote end user devices.

For example, and not for limitation, the application (e.g., the M3 application) can be coordinated with the information processing system 1200 (server) that can automatically transmit alert(s) to a particular student user, to a particular mentor user, or both. The alert(s), as a first example, can relate to new available information resources which are relevant to tasks a particular student user has completed or should complete. Such alert(s) can include the M3 application displaying on a display of the remote user device 1263, 1264, that is associated with a particular user, certain links to the new available information resources. Optionally, at least some of the resource information can form part of data transmitted from the information processing system 1200 to the particular student user at the remote user device 1263, 1264.

The alert(s), as a second example, can relate to the information processing system 1200 (server) analyzing user information records in the databases 1216, 1218, and determining that particular user information stored in at least one user information record (e.g., stored in a standard format) has been updated (e.g., changed), and thereby the system 1200 identifies a likely best match between a particular student user and a particular mentor user. The information processing system 1200, based on the analyzing, determining, and identifying a likely best match, can automatically send an alert to a particular remote user device of a student user, to a particular remote user device of a mentor user, or both. The particular user(s) in response to receiving the alert(s) can very quickly (near real-time) access the information processing system 1200 and accordingly review, download, or both, the particular user information that has been updated. This automatic communication of alerts and data, for example, can increase the speed and efficiency of an information processing system 1200 to process updates to user information and to quickly and automatically alert remote user device(s) 1263, 1264, of one or more particular users who might find the updated user information particularly relevant to an aspiring health professional student's progress along a customizable path to medical school acceptance.

Referring more specifically to the example of FIG. 12, according to various embodiments, an example machine-learning artificial intelligence (ML/AI) system is communicatively coupled with the information processing system 1200 and can be used by the user match analyzer 1242, for example, to analyze particular user information stored in each user record, and thereby identify a likely best match between a particular student user and a particular mentor user. The information processing system 1200 thereby can automatically notify, for example, individual users or pairs of users of their potential likely match. The system 1200, according to certain embodiments, can automatically provide user contact information to the matching users to facilitate them to establish communication and a mentorship relationship between them.

It should be noted that user information in the databases 1216, 1218, is continuously changing as user information is added, deleted, or changed, in user information records in the databases. For example, as a student user is progressing in their educational institution admission process, their user record is updated, and user information can be added, deleted, or changed.

The compatibility (match) of a student user to a mentor user, thereby can be changing over time and the system 1200 can notify a student user, a mentor user, or both, that there is a likely best match between the pair of users, or between the particular student user and another mentor user that might be a likely better match with the particular student user while progressing in the overall educational institution admission process. The system 1200, interoperating with the user match analyzer 1242, can efficiently and repeatedly over time analyze particular user information stored in each user record, and thereby identify a likely best match between a particular student user and a particular mentor user; and in certain embodiments automatically notify the student user, a mentor user, or both, of the likely best match between the student user and the mentor user.

Such an ML/AI system can include, according to various embodiments, a set of classifiers 1220 that are used to extract features (e.g., using the feature set values extractor 1244 in the instructions 1207) of certain user information stored in the databases 1216, 1218. Classifiers 1220 can also include functions and operations stored as a collection of classifiers 1248 in instructions 1207. The ML/AI system trains the classifiers 1220 with a training data set 1222 that includes user information from certain user records from the databases 1216, 1218.

In this example ML/AI system, each training data set includes user records that each are labeled by an expert who understands which certain features of student users are best matched with certain features of mentor users. The classifiers 1220 can be repeatedly trained with different training data sets to enhance the accuracy of analysis and identification of likely best match between a student user and a mentor user. This repeated training can be repeated on classifiers 1220 that have been previously trained. On occasion a training data set can include intentionally selected poorly matching candidate user information records which could be used by the classifier builder 1246 to enhance accuracy of particular classifiers 1220 by increasing the ability to discriminate between features of certain user information. This repeated training of classifiers 1220 over time continuously enhances their discrimination performance to avoid matching certain student users to certain mentor users that comprise poor matching user information.

The ML/AI system receives user information from the databases 1216, 1218, and stores the information in a repository as session data 1226. The ML/AI system uses the trained classifiers 1220, the decision rules 1224, and the decision rules processor 1250, to identify likely best matching student users and mentor users.

The user match analyzer 1242 can compare features of user information identified in student user records to features of user information identified in mentor user records. An overall user information matching process is coordinated over time by the user inspection process controller 1240. The user inspection process controller 1240 also interoperates with the user match analyzer 1242 to coordinate and perform aspects of the various embodiments of the invention.

As shown in the example of FIG. 12, the processor 1202 can be communicatively coupled with a computer-readable medium 1232. The computer-readable medium 1232, according to the present example, is communicatively coupled to a reader/writer device 1230, which is communicatively coupled via the system bus 1208 to the processor 1202.

The instructions 1207, which can include computer instructions, configuration parameters, and data, can be stored in the computer-readable medium 1232, the main memory 1204, the persistent memory 1206, and the processor's internal memory such as cache memory and registers.

A network interface device 1260 is communicatively coupled with the processor 1202 and provides a communication interface for the information processing system 1200 to communicate via one or more networks 1262. The networks can include wired or wireless networks or a combination of both, and can be any of local area networks, wide area networks, or a combination of such networks. For example, wide area networks, including the Internet and the web, can inter-communicate the information processing system 1200 with other information processing systems that may be locally or remotely located relative to the information processing system 1200. It should be noted that example mobile communications devices 2163, 2164, such as mobile phones, Smartphones, tablet computers, lap top computers, and the like, which are capable of at least one of wired or wireless communication, are also examples of information processing systems within the scope of the present disclosure.

M3 (Mentoring Minorities in Medicine) App

The M3 App and intended outcomes can vastly improve the experience of minority students who wish to enter healthcare professions to encourage and facilitate more minority healthcare leaders in the future.

In the drawings and herein, the terms PTH designates the pathway interface of the app; CHK the checklist; TSK the task; QVP the question viewing portal/interface; TS tag screens; PAQ post a question; and AAC answers and comments.

A schematic overview of an example computer application, also referred to as the M3 (Mentoring Minorities in Medicine) App, is shown in FIG. 1. This M3 App will be discussed more fully below.

App Features: The instant inventors' research shows that this app will be the first of its kind, and a comparable app does not exist in either the Google Play or Apple App stores. This unprecedented, gamified app will serve as a dashboard for students who wish to embrace a career in healthcare. The minimum viable product (MVP) version of the app includes three main features as follows:

Pathway and Checklist Tabs:

Allows students to track their progress regarding applying to and getting accepted to medical school or another health field. The animated, visually appealing pathway serves as the landing page for this app. While the developers will provide major milestones that every prospective medical student should achieve, users also have the option to add and remove items so that this pathway is specific to each user's goals. The pathway can be gamified and incentives for advancement on the pathway towards a career in healthcare can be embedded.

Resources Tab:

Provides a compilation of information from vetted sources in six distinct categories (class resources, MCAT resources, experience, application help, scholarships and tips).

Mentor Forum Tab

Provides a space for users to ask questions to predefined mentors regarding their path to medical school and for users to connect with current, vetted medical students, physicians, health care leaders and medical school faculty who offer their support. Mentors are rewarded with various recognition icons as an incentive to provide useful career advice. Mentees/users assign "likes" to useful mentor advice, allowing the most useful career advice to rank high on the list of career advice answers.

Figures 6A, 6B:
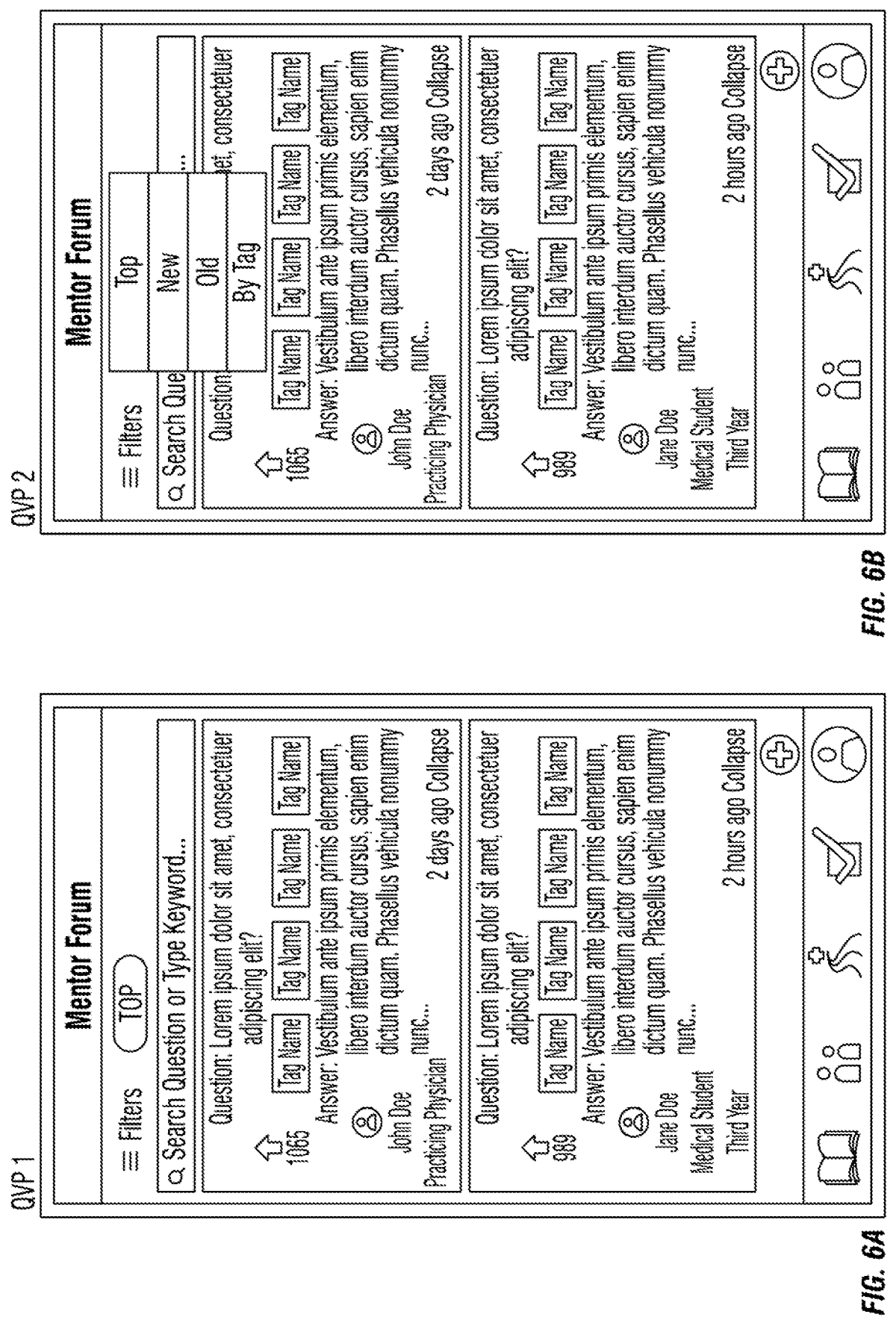
Figure 6D:
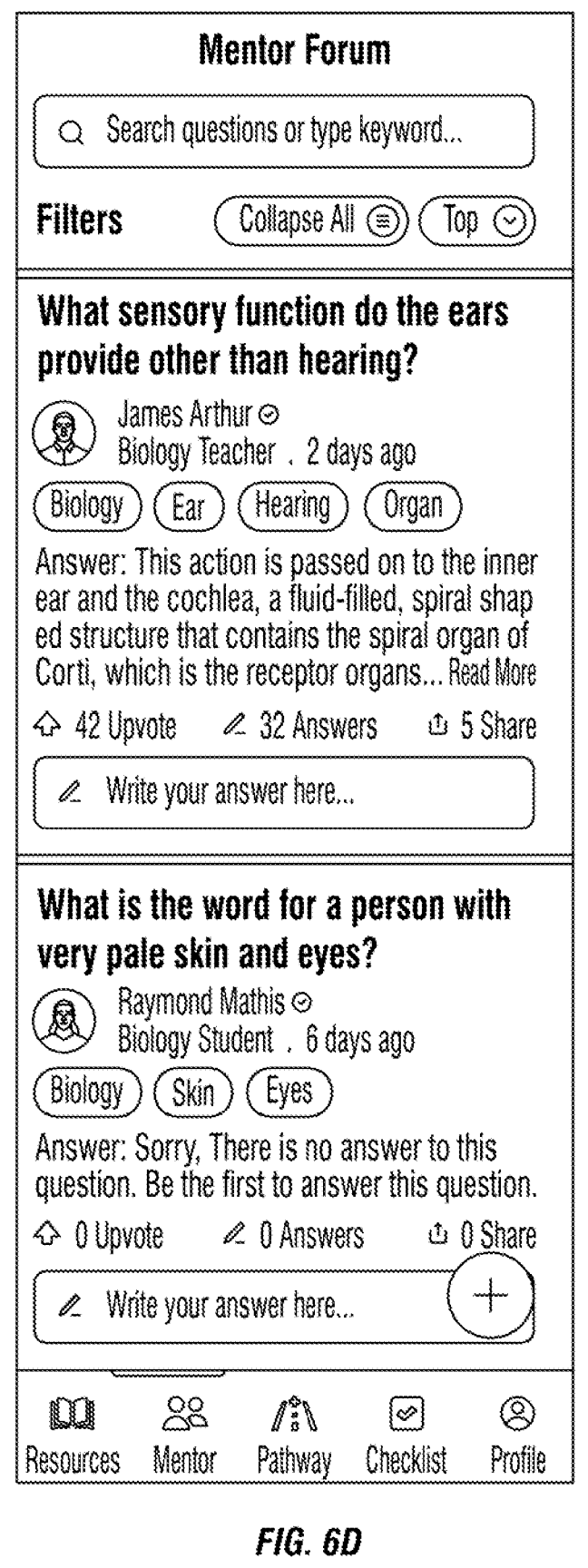

QVP Screens 1-3 (FIGS. 6A-C) show question viewing portals where users search for, filter, and view questions.

TS Screens (FIGS. 7A-D) are tag screens where users can view and search tag categories.

PAQ Screens (FIGS. 8A-D) show space where users can post and tag questions.

AAC Screens (FIGS. 9A-D) shows space for answering posted questions and adding comments.

This unique blend of resources and support specifically tailored for the minority population will change the trajectory of hopeful medical students throughout the nation.

Homepage Mockup: My Pathway. This page serves as the landing page—the first page a user sees when they open the app. This page can be pre-populated for the user with bare minimum requirements and users have the option to add their own goals and milestones. From this page, users can access a checklist (a list version of My Pathway) as well as a toolbar that allows users to navigate through the other features of the app (Mentor tab, Research Opportunities tab, and the user's profile). The toolbar is accessible from all tabs and screens within the app.

Profile. This page allows users to input information about themselves pertaining to their medical school journey. On the backend, this information will be used to curate appropriate resources that will appear on the resources tab (i.e. scholarships, research opportunities, etc.).

Pathway

This main pathway landing page serves as a measure of progress of the user's journey along their path to medical school. As the user completes tasks (either pre-entered or newly created), their "marker" (e.g., the caduceus as seen on PTH 3 (FIG. 3C); can be editable by uploading a profile picture), advances to the next blue "dot," filling up the stethoscope with blue as they go. Upon the completion of their journey, they will see their marker at the apex of their completely blue stethoscope.

Checklist

Figures 4A, 4B, 4C, 4D:
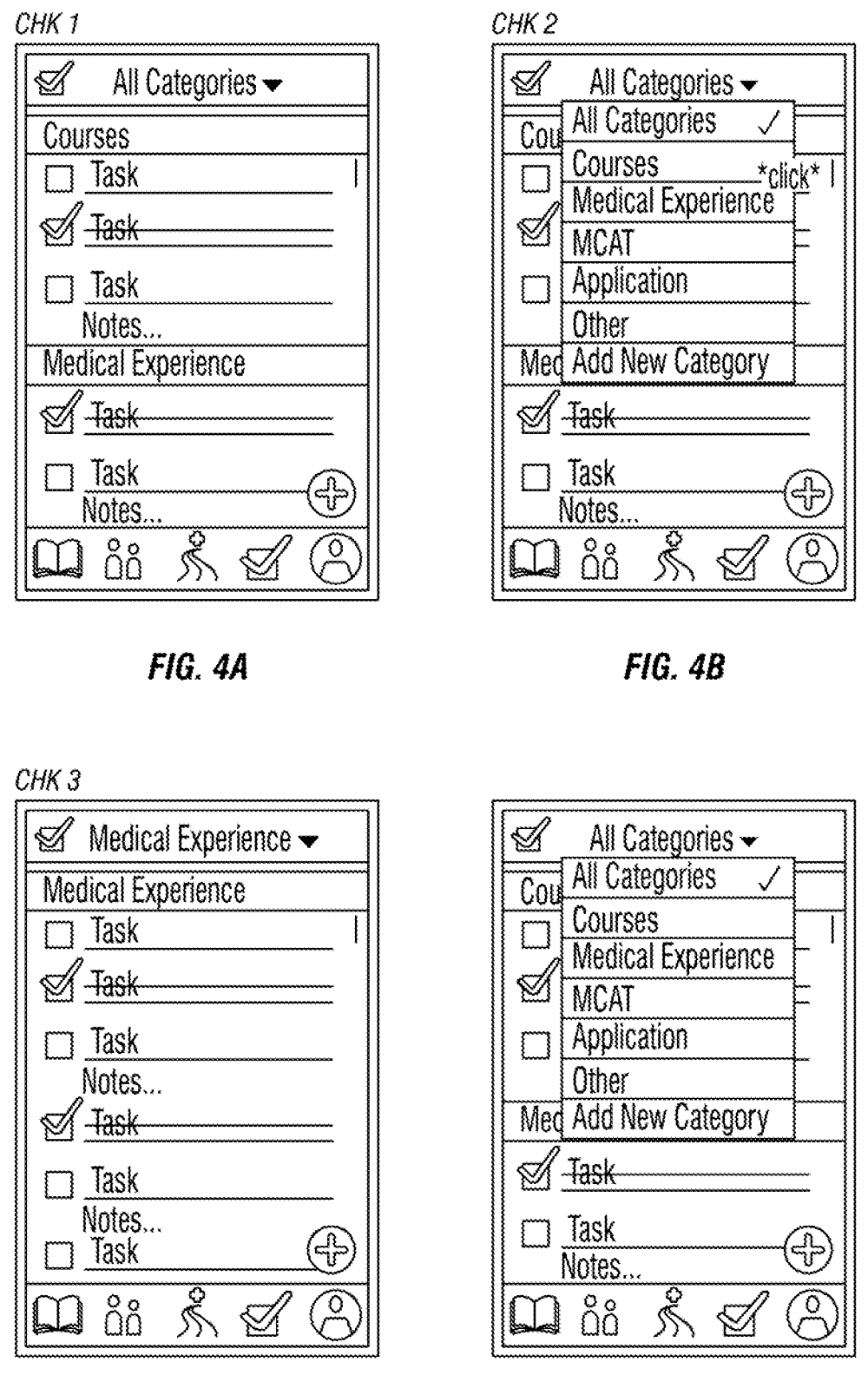
Figure 4E:
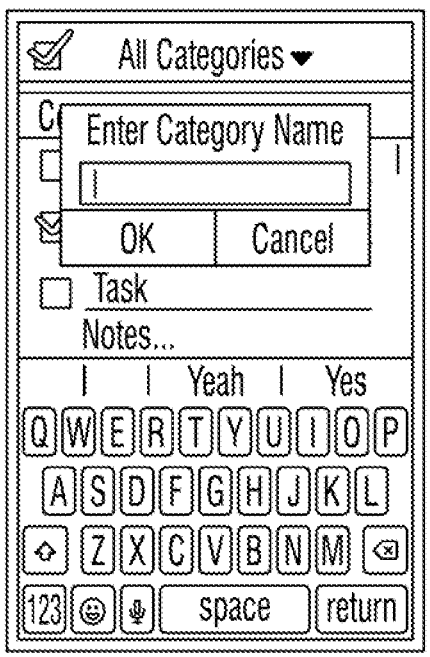
Figure 4F:
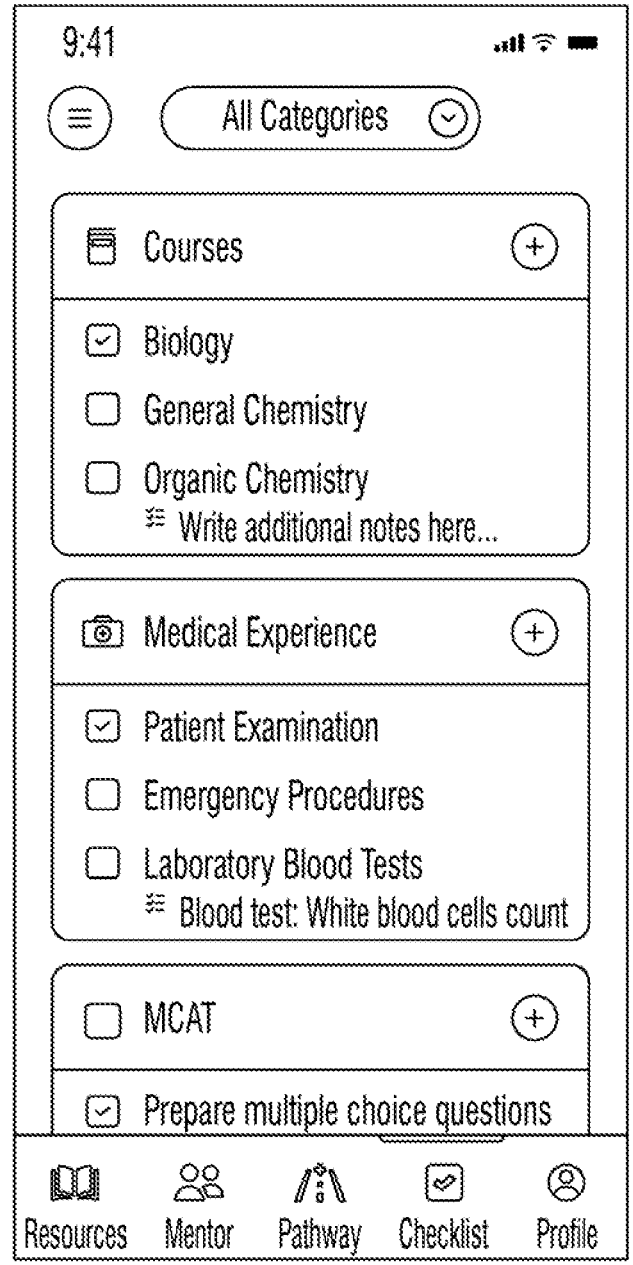
FIG. 4F depicts a CHK page of an iOS compatible app of the disclosure.

The checklist feature is a list version of the pathway on the landing page. This tab makes the journey to medical school very customizable and personable as each user has a distinct path to the same destination. From here, the user can view and check off all of their tasks (CHK 1, FIG. 4A), filter by category (CHK 2, 3, FIGS. 4B and 4C), and add a new category (CHK 4, 5. FIGS. 4D and 4E) and/or task.

Task Creation in Checklist

Figure 5A:
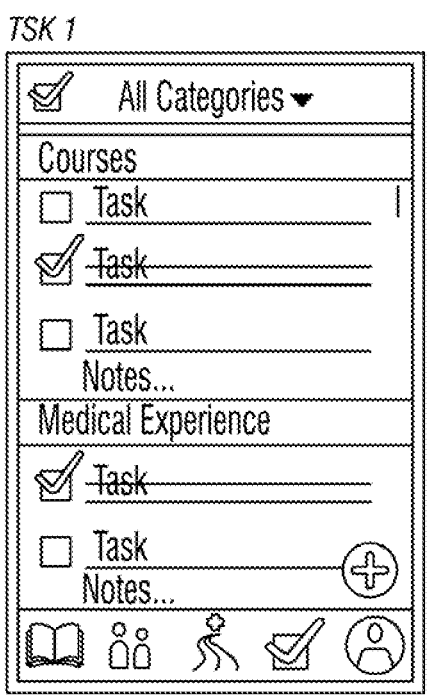
Figure 10:
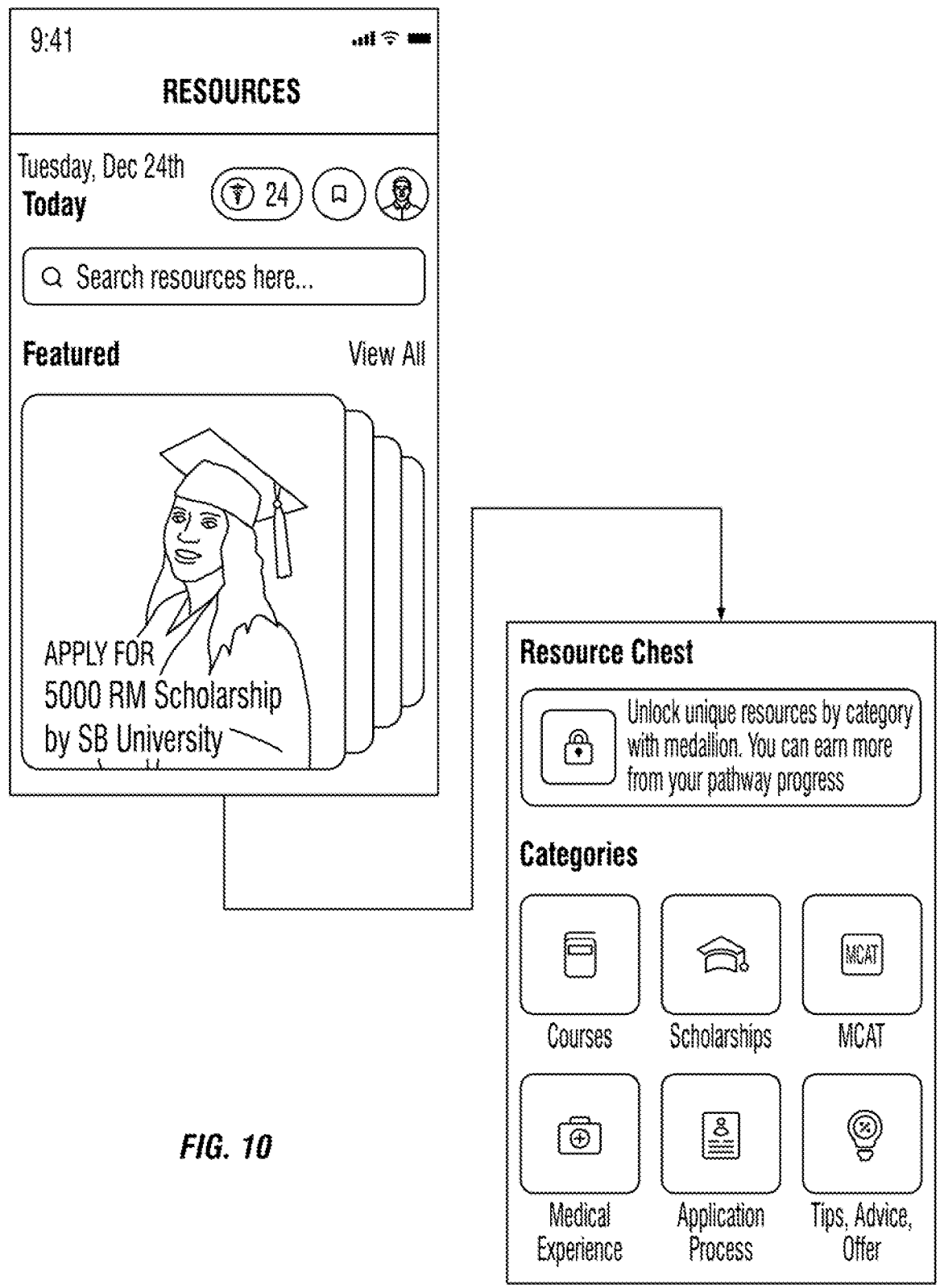
FIG. 10 depicts a Resources page of an iOS compatible app of the disclosure.

Once on the Checklist tab, the user can add a new task to their path by clicking on the blue plus button in the bottom-right corner of the screen (TSK 1, FIG. 5A). Upon clicking the blue plus button, a keyboard will pop up and the user is prompted to enter a name and category for their task (TSK 2, 3, FIGS. 5B and 5C) as well as any additional notes (that can be viewed in the checklist). If the user has filtered the tasks of one category from the main checklist screen, the user can proceed to "Quick Add" tasks in that category as the category section will be pre-filled (TSK 4, FIG. 5D). Upon adding new tasks in this checklist, additional markings (e.g., "dots") appear on the pathway, elongating the stethoscope on the landing page. According to an example, the markings or "dots" are displayed along the curvilinear pathway and equally spaced apart a distance between pairs of dots based on the number of dots filling the curvilinear pathway from a dot that corresponds to a next task to be completed to a dot in the curvilinear pathway indicating completion and check-off of all tasks in the check-off interface.

Following are highlights of various interfaces and sections of an app of the disclosure as disclosed herein, detailing content, presentation, and appearance.

General Information

FONT: Helvetica Neue

Overall color scheme: blue/white/grey/red

When something on navigation bar is clicked, the graphic will be bolded (ex. If pathway is selected, pathway graphic is bolded, like with INSTAGRAM)

Add settings, information (FAQs), and tutorial using three lines under Profile Section 5

Notes viewing

SECTION 2: Pathway & Checklist

Pathway: PTH (FIGS. 3A-F)

This section visually represents the tasks the user is completing as a pathway to their final goal. As an example, a pathway comprises a curvilinear pathway, such as resembling a winding road or a winding flight path, extending from a starting point to a destination point. In another example, a curvilinear pathway resembles at least a portion of a stethoscope. The example curvilinear pathway resembling a stethoscope is discussed here which provides a relevant symbol for an aspiring student of medical school. As the aspiring student (which may also be referred to as a prospective student or a student) user completes tasks (either pre-entered or newly created), their "icon" (e.g., a user's completion status icon can be displayed as the caduceus circle symbol seen on PTH 3 (FIG. 3C); editable by uploading a profile picture), advances to the next dot or milestone marker, filling up the curvilinear pathway resembling a stethoscope with blue as they complete milestones/tasks. The notes are detailed below and mainly involve the visual aspects of the app, emphasizing the gamification feature of users tracking their progress.

PTH 1 (FIG. 3A)—

PTH 1 is the first screen (e.g., in a pathway interface) that the user will view after clicking the pathway button on the running navigation bar and will also be the main landing screen when the user opens the app (after they have signed in).

The path, for example a curvilinear pathway resembling at least a portion of a stethoscope, will automatically be opened to wherever the icon currently is placed.

Figure 3A:
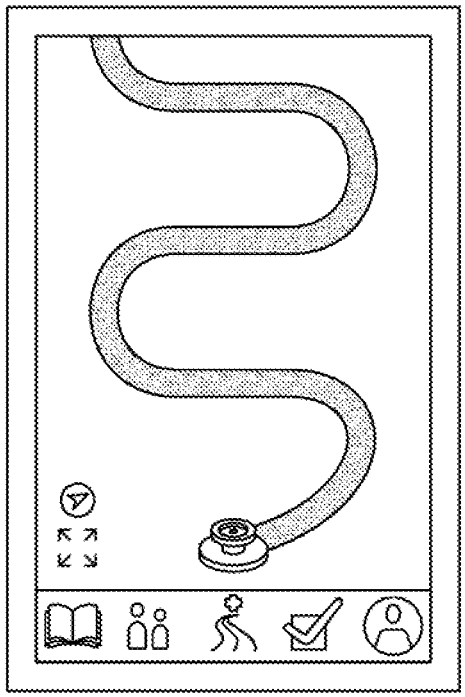
FIGS. 3A to 3E are diagrammatic illustrations of example curvilinear pathway (PTH) screens 1-5, respectively.
Figure 3B:
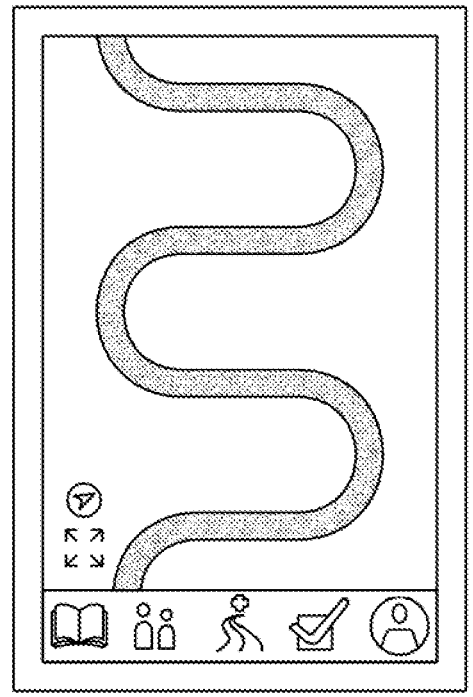
Figure 3C:
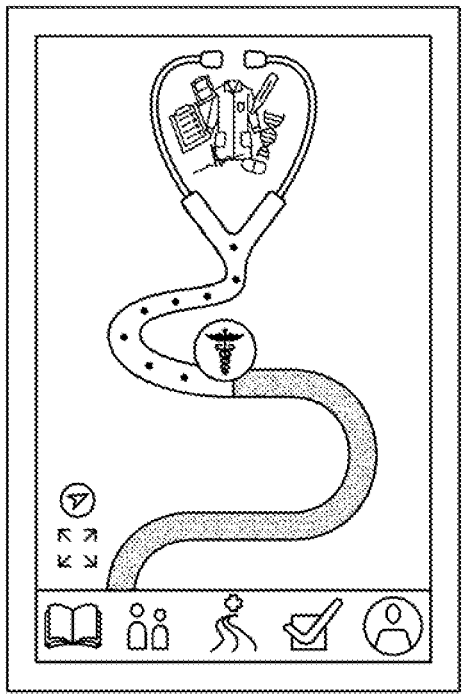

Users can scroll up or down along the curvilinear pathway to reveal more of the stethoscope (PTH 2-3, FIGS. 3B and 3C).

Figure 3D:
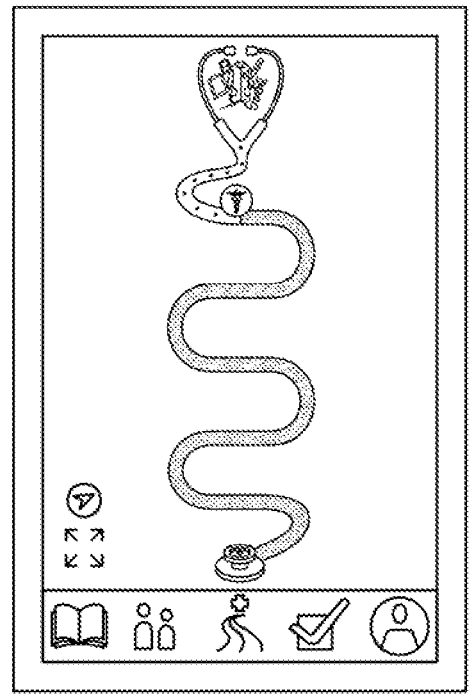

Clicking the arrows on the bottom left corner lead to PTH 4 (FIG. 3D).

Figure 3E:
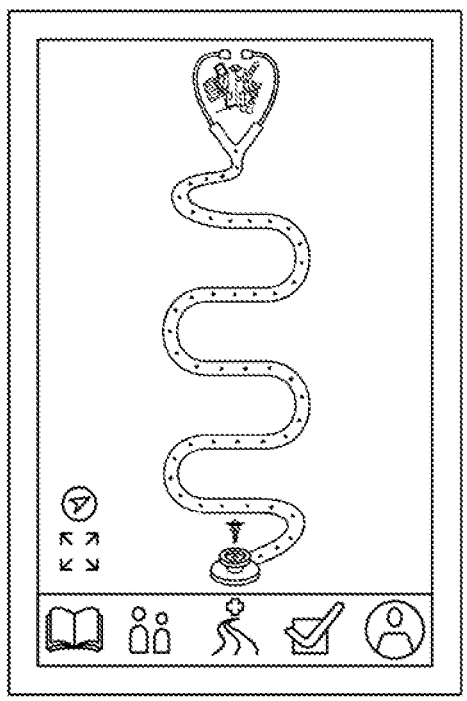
Figure 3F:
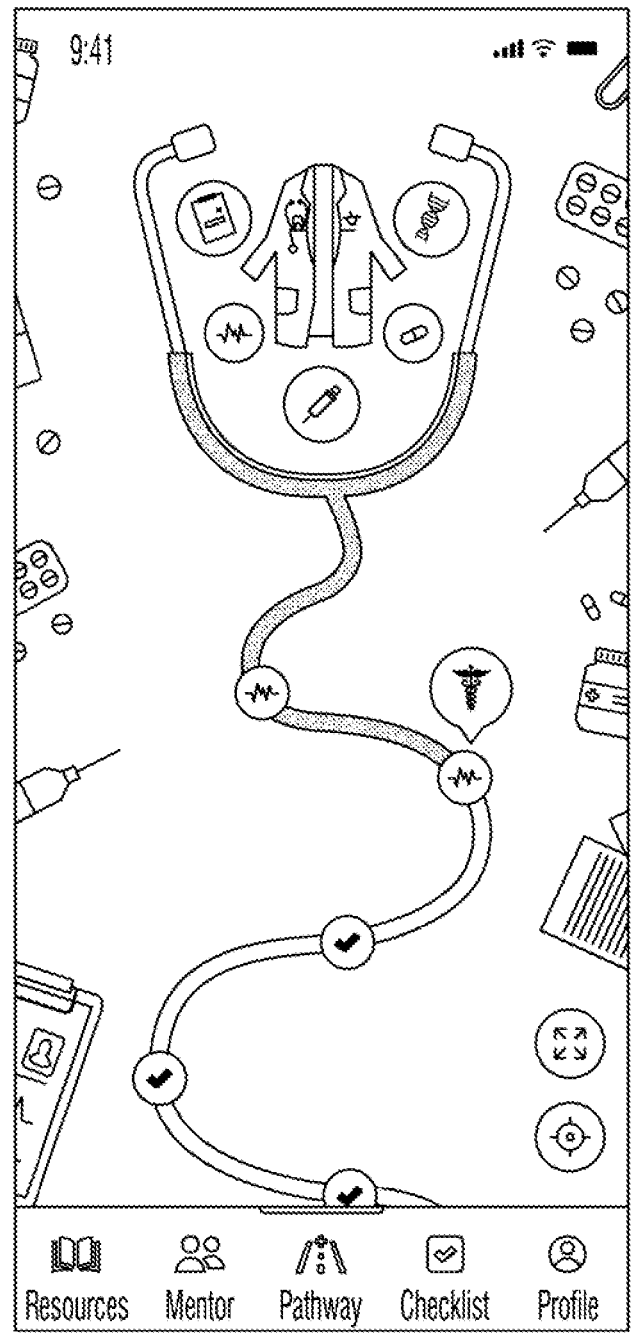
FIG. 3F depicts a PTH page of an iOS compatible app of the present disclosure.

First time users will have their icon (e.g., a caduceus circle, a staff of Asclepius, or another such symbol, where the icon can be customizable in the profile to be a meaningful symbol to the aspiring health profession student) at the base of the stethoscope and the stethoscope will be entirely white with the blue dots in the middle (PTH 5, FIG. 3E).

There are a specific number of dots along the curvilinear pathway that correspond to the maximum number of tasks available (e.g., remaining to be completed and checked-off) on the checklist.

There can be five, for example, or another number of dots along one "curve" of the pathway.

If the user has created less than the max available tasks, then the movement of the pathway (e.g., the spacing between pairs of dots) adjusts to have each completed task equally spaced the same distance to be moved along the curvilinear pathway.

The following description assumes the user has created the max number of tasks available and therefore, each dot along the pathway corresponds to a task.

Edits made to the checklist section (CHK 2-3, FIGS. 4B and 4C) correspond to movement on the pathway.

Any changes made on checklist before opening pathway will be summed to create a net checked tasks/movement along path.

For example, if the user checks off three tasks and unchecks one, the net checked number of tasks is two. When the user opens the pathway, the icon will move a net number of dots, e.g., two dots, "forward" along the pathway.

No movement will occur until the next time the user opens up the pathway screen.

If the user makes edits on the checklist and then closes the app, the pathway movement will occur when the user reopens the app, since the pathway is the landing screen.

When the user checks off tasks, the icon moves "forward" along the dots in the curvilinear pathway and the stethoscope is filled with blue up to that point.

The icon's movement is animated (like pieces moving along a game board, e.g., "candy crush" style). It is understood that the icon does not merely pop up at a dot corresponding to a net number of dots either "forward" or "backward" along the curvilinear pathway.

The icon is centered above the dot it has filled.

This movement occurs whenever the user opens up the pathway after editing on the checklist.

The pathway will automatically open up to the area of the stethoscope where the movement will occur, not necessarily the base of the stethoscope.

When the user unchecks tasks, the icon moves "backward" along the dots and the stethoscope is reverted back to the white stethoscope with blue dots.

PTH 3 (FIG. 3C)—End of Pathway

The user can scroll to view the end of the pathway.

When all tasks are completed and the user opens up the pathway, the final movement along the path occurs and the icon reaches the end dot at the apex of the completely blue stethoscope.

Apple style gold and silver confetti is animated on screen along with a pop up message "Congratulations!".

PTH 4 (FIG. 3D)—Full Pathway View

The user views this screen after clicking the zoom arrows (bottom left-hand corner) on zoomed in pathway screens (PTH 1-3, FIGS. 3A, 3B, and 3C).

This screen is not scrollable, as everything on the pathway is visible to the user, and it is also not zoom able. Nothing will happen if the user taps on any part of this screen, except for the zoom arrows and the "locate my icon" button (above the zoom arrows on the bottom left-hand corner).

If the user clicks the zoom arrows (bottom left-hand corner) while on this screen, it will lead to PTH 1 (FIG. 3A) again.

If the user clicks the "locate my icon" button (above the zoom arrows on the bottom left-hand corner), the pathway will zoom to wherever the user's icon is currently.

For example, if while on PTH 4 (FIG. 3D), the user presses the "locate my icon" button, it will display PTH 3 (FIG. 3C) screen.

PTH 5 (FIG. 3E)—Full Empty Pathway

This screen shows how the full pathway will look when the user has not completed any tasks and has pressed the zoom arrows (bottom left-hand corner) in the corner to view the full path.

The dots along the path represent a task (or set of tasks) that the user has to check off on the checklist in order to advance on the pathway. The dots should be placed in a manner such as displayed on the screen (there are about six dots per curve of the stethoscope pathway).

Approximately, every four dots that the user advances will unlock a unique resource for them to access.
  After the icon animated movement finishes, the user will see an Apple style pop-up with the message "Congratulations! You have unlocked 1 resource!" and the options are "OK" and "View Resources".
  If the user presses OK, the pop-up will close and their screen will be left on the pathway that they were initially viewing.
  If the user presses "View Resources", they will be taken to the resources tab.
If the user has advanced multiples of four, they will receive the corroborating number of resources. (For example, if the user advances 8 dots, they will receive two resources, and the message will read "Congratulations! You have unlocked 2 resources").

Checklist: CHK (FIGS. 4A-E)

The checklist feature is a list version of the pathway on the landing page. From here, the user can view and check off all of their tasks (CHK 1, FIG. 4A), filter by category (CHK 2, 3, FIGS. 4B and 4C), and add a new category (CHK 4, 5, FIGS. 4D and 4E) and/or task. The checklist is linked to the pathway; if the user completes a task on the checklist, their "icon" on the pathway moves up. This feature is highly customizable for all users with unique paths to the same destination.

CHK 1 (FIG. 4A)—First Checklist Screen
  PTH 1 (FIG. 3A) is the first screen the user will view after clicking the checklist button on the running navigation bar.
  The user can scroll through the checklist to view the tasks under each category and there will be a scroll bar on the right side of the screen.
  The top bar with the checklist logo and drop down category selection will remain at the top and will not move as the user scrolls.
  The line under the task name should be a thinner/lighter line than on screen CHK 1 (FIG. 4A).
  Completing tasks
    Once a user completes a task, they can "check it off" by clicking the box next to the task.
    A check appears in the box and the task is greyed out and crossed out simultaneously.
    This task completion is linked to pathway advancement (each task checked off is one dot moved forward along the path).
  Unchecking tasks
    A user can also uncheck a task by clicking on the checked/greyed out box.
    This will prompt a pop up (apple style, similar to the one pictured in CHK 5, FIG. 4E) asking the user "Are you sure you want to uncheck this task?" and in smaller font underneath, "Saying OK will cause you to move backward along the pathway". The options for the user to press are OK and Cancel.
    If the user presses "OK", the pop up will disappear, the task will return back to normal color, and the check/crossed out words will be removed from the box simultaneously. This will cause the icon to move backward one step on the pathway.
    If the user presses "Cancel", the pop up disappears and the task remains the same, greyed out and the box is checked.
  CHK 2-3 (FIGS. 4B and 4C)—Filtering Categories
  This screen appears when the user clicks on the upside-down triangle or the name of the category.
  The user can then tap on one or more categories to have a check appear next to it (and the text changes color) in order to selectively view tasks.
    (CHK 3, FIG. 4C} For example, if the user taps only "Medical Experience" and then closes the drop down, the only tasks available to view are those of the Medical Experience category.
    To view/edit tasks in other categories, the user must select that category in the drop down or "All Categories".
  If the user clicks "All Categories", the other categories are unchecked.
  If the user clicks "Add New Category*. it leads to CHK 4-5 (FIGS. 4D and 4E)
  The user can tap a checked category again to uncheck/unselect it.
  In order to close the drop down, the user can either click the top bar with the triangle again or click off the screen (this function is low priority, and having the user click the top bar with triangle in order to close it will be alright).
  CHK4-5 (FIGS. 4D and 4E)
  The user can add a new category by clicking "Add New Category" on the drop down menu (CHK 4, FIG. 4D).
  This will lead to CHK 5 (FIG. 4E), a pop up where the user can enter the category name.
  The keyboard will slide up simultaneously with the pop up so the user can enter the category name. The first letter of each word of the entered category will automatically be capitalized.
  If the user presses "OK", the category will be added. This new category can be viewed in the drop down and the "All Categories" section while scrolling.
  If the user presses "Cancel" no record of the category will remain and nothing will change.

Task Creation: TSK (FIGS. 5A-D)

This feature of the app enables users to customize the pathway and checklist that is pre-filled. As previously described in CHK 4 (FIG. 4D) and 5 (FIG. 4E), the user can add new categories to their pathway for further specification/organization. Similarly, the user can also add new tasks within each of these categories that will be added to the checklist and thus count as progress along the stethoscope pathway if completed. This process will be described in more detail in the context of the TSK screens 1-4 (FIGS. 5A-D) created.

TSK 1-2 (FIGS. 5A and 5B)
  Upon clicking the blue plus button in the bottom right hand corner of the checklist screen (this button constantly appears on the screen, floating, as the user scrolls the checklist) in TSK 1 (FIG. 5A), a new screen and keyboard populates the device screen as shown in TSK 2 (FIG. 5B), with a blinking typing cursor in the "New task" box where the user can immediately begin typing their new desired task. Upon adding new tasks in this checklist, additional "dots" will appear on the pathway, elongating the stethoscope on the landing page.
  The checklist icon at the top middle of the screen (same as icon from navigation bar) as well as the blue square next to the "New task" text box are nonfunctional icons only. The square blue checkbox becomes functional on the checklist screens (CHK 1, FIG. 4A); then, upon clicking, it completes that task and a checkmark appears on the checklist screen (resulting in advancement along pathway).

By clicking "Cancel" on the upper left-hand corner, the screen and keyboard slide up and down respectively, disappearing from the screen and revealing the checklist screen as the user left it (with appropriate filters as user had chosen before). The task they started creating is not saved at all.

By clicking "Save" in the upper left-hand corner, the task they had created is saved and added to the end of the appropriate category selected. The saved new task now appears on the checklist screen, and its completion will result in advancement along the pathway (exactly how the pre-filled tasks function).

If the user clicks "Save" without entering a task name or choosing a category, the following error message pops up with an "OK" option to remove the pop-up and enter name/category: "Please enter task name to save a new task to your checklist." or "Please choose a category for your new task."

Figures 5B, 5C, 5D:
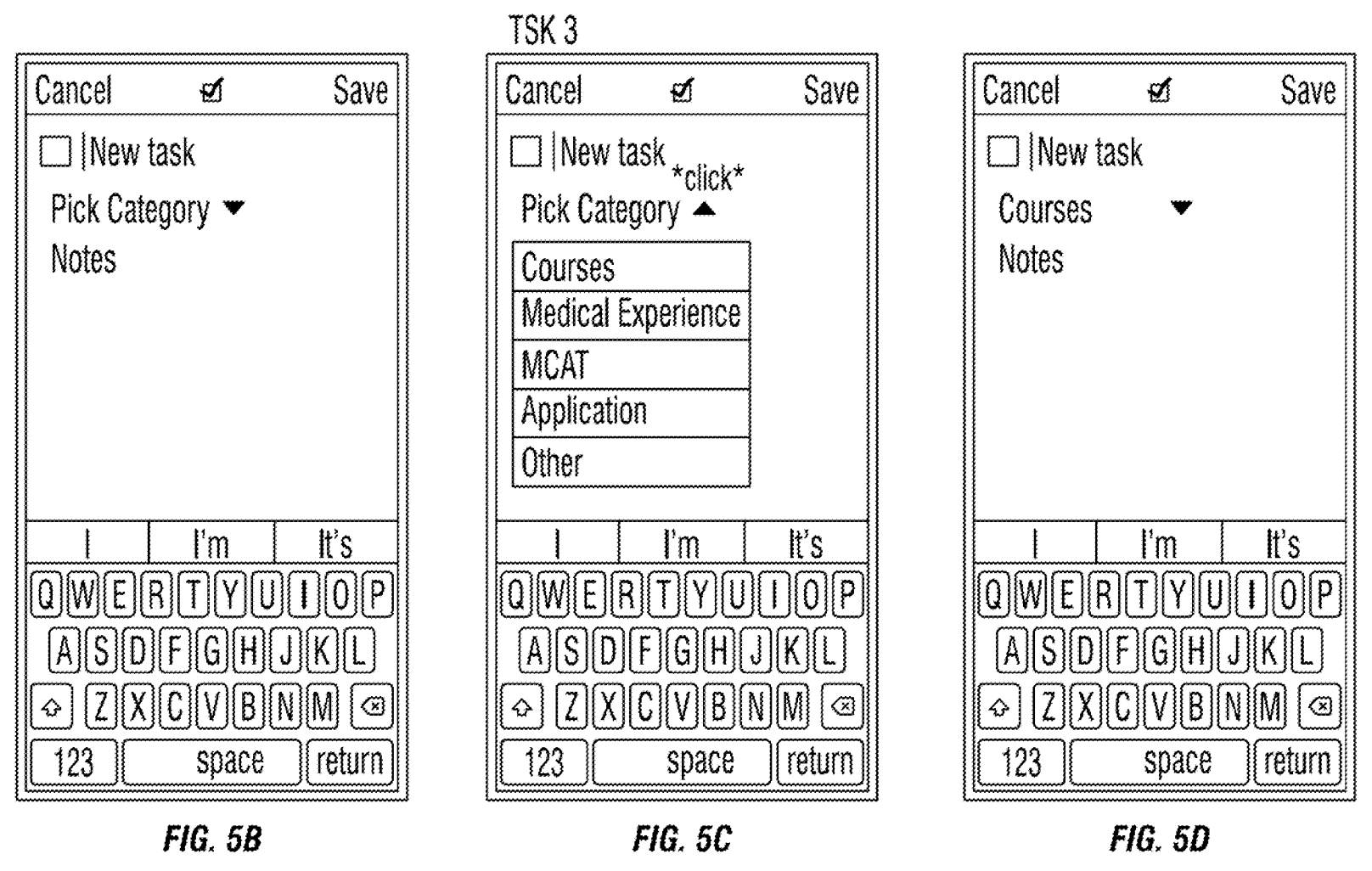

To choose a category, user clicks anywhere on the "Pick Category" box with the upside-down triangle to prompt a drop down as shown on TSK 3 (FIG. 5C).

User can add notes to tasks by clicking on the notes section. If editing an already created task, the user must click "Save" after editing/adding notes. Clicking "Cancel" will not save the edits/additions.

Limit is two lines beneath the task, text size is 8 points smaller than task name font size.

TSK3 (FIG. 5C)

Clicking "Pick Category" or the upside-down triangle on TSK 2 (FIG. 5B) leads to the drop down shown on TSK 3 (FIG. 5C).

Although keyboard is shown to stay up in TSK 3 (FIG. 5C), the keyboard should actually disappear when the category drop down appears and should only reappear when clicking to edit new task name or adding/editing notes.

The drop-down menu should show all current categories the user has maintained (including any of the following: pre-filled categories in app, new categories, edited categories).

Upon clicking a category, the drop-down closes and the name of the category selected appears in place of the "Pick Category" text, as shown on TSK 4 (FIG. 5D).

If the user wishes to change the category, they simply click on the upside-down triangle or the name of the category, upon which the drop-down will pop-up again, showing a check next to the previously selected category. The user can then click a different category to replace the previous one, the same checked category, or outside of the drop-down menu to close it.

TSK4 (FIG. 5D)

TSK 4 (FIG. 5D) is the screen that appears (as shown with the pre-filled category) when the user wants to Quick Add tasks to a certain category. It works as follows:

The user filters a specific category on the Checklist screen as shown in CHK 2-3 (FIGS. 4B and 4C). o Then, if the user clicks the blue plus button, the filtered category will be pre-filled and the user only needs to add a task name and click "Save" to add the task.

The user can still click the upside-down triangle or category name to edit the category.

Mentor Interface

GENERAL

Color Scheme: Blue (#448acb)/White (#ffffff)/Gray (#6f6f6f)

Main Font: Inder

The top bar (also known as title bar) and the navigation bar remain at the top and bottom of all screens, respectively. They should not be affected by any scrolling mechanism or change to opacity (always remain 100% opaque).

Question Viewing Portal: QVP

From here, the user can view questions and answers submitted by other app users as well as filter, search, and sort available questions/answers.

QVP 1: Mentor Forum Landing Page

When clicking the Mentor Forum button on the navigation bar, it automatically leads to this screen.

The top bar is a blue bar with the words "Mentor Forum" (in white) centered. This bar should never move and always remain at the top of the screen, even when the user scrolls.

Under the top bar, there is a drop down box labelled "Filters". When the user clicks the box, it leads to QVP 2. This box should not move when the user scrolls.

Next to the "Filters" drop down box is a blue oval that is filled with the filter (centered in white letters) selected by the user from QVP 2. This oval should not move when the user scrolls.

When the user first selects the Mentor Forum button on the navigation bar, this oval is automatically filled with the "Top" filter. This is the default filter and will be there when the user doesn't select a filter.

QVP 2 includes information on what happens if the user does select a filter.

Under the "Filters" drop down box, there is a Search bar, which should lead to the opening of a scrolling bar listed with the top five or six suggestions based on the keywords typed.

When the user clicks the Search bar, the phrase "Search Question or Type Keyword . . . " disappears and a keyboard should appear, allowing the user to type keywords.

Under the Search bar are the Question Boxes.

In the Question boxes, the first line should be the entirety of the typed question.

Under the question will be the tags the writer of the question selected from the PAQ screens. If needed, the user should be able to scroll sideways on this line to fully see all the tags selected.

Under the tags will be the top voted answer selected by the writer of the question. The first two lines of the answer should be shown and, if needed, an ellipses will follow the answer to indicate the answer continues.

The question boxes includes upvotes to the left of the tag line. This is represented by an arrow and a number (under the arrow). The user should be able to click the arrow to upvote the question, and the number under it represents the amount of upvotes the question received.

The profile of the answerer is located on the bottom left of the question box. This includes the profile picture with the answerer's name under it. Under the name is the answerer's qualifications such as Practicing Physician.

In the bottom right corner of the screen, there is a plus button, which should lead to the PAQ screens. This button should always remain at the bottom right corner and will not be affected by scrolling.

The user should be able to scroll on this screen in order to see all the question boxes. When the user scrolls, the only items that should change are the Search bar and Question boxes. The title bar, "Filters" drop down box, filter selected by the user (in blue oval next to "Filters drop down box), plus button, and navigation bar should not move when the user scrolls.

QVP 2: Filter (Sort) Feature

This screen appears when clicking the "Filters" drop down box. It shows the filters the user may select.

When the "Filters" box is clicked, the opacity of the QVP 1 screen changes from 100% to 20% in order to see the filter options.

The only components from QVP 1 that stay at 100% opacity are the top bar, "Filters" drop down box, and navigation bar.

The QVP 1 screen (at 20% opacity) should remain in the background.

The filter options of "Top", "New", "Old", and "By Tags" appear on the right side of the "Filters" box. The user can pick either the "Top", "New", or "Old" option and should not be able to choose more than one of these options.

If the user picks the "Top" option, the screen changes back to QVP 1 with the word "Top" in the blue oval next to the "Filters" drop down box. The question boxes are then rearranged in the order where the questions are shown from the most to least upvotes.

If the user picks the "New" option, the screen changes back to QVP 1 with the word "New" in the blue oval next to the "Filters" drop down box. The question boxes are then rearranged in the order where the questions are shown from the newest to oldest posted question.

If the user picks the "Old" option, the screen changes back to QVP 1 with the word "Old" in the blue oval next to the "Filters" drop down box. The question boxes are then rearranged in the order where the questions are shown from the oldest to the newest posted question.

If the user picks the "By Tag" option, the screen changes to TS 1. This option is different from the "Top", "New", and "Old" options since it leads to the TS screens instead of QVP 1. It also does not appear in the blue oval next to the "Filters" drop down box.

QVP 3: Tag Display on Landing Page

This screen is an example of how tags are displayed on QVP 1.

When the user selects the "By Tag" option from QVP 2, it leads to the TS screens. Once the user exits from the TS screens after selecting a tag (or multiple tags), the selected tags are displayed on the right of the blue oval showing the filter on QVP 1.

If multiple tags are selected and it cannot fit on the same line, the user should have the ability to scroll sideways in order to see all the selected tags.

The user should only see question boxes where the question has at least one of the same tags the user selected. The "Top", "New", or "Old" filters, depending on what the user selected, should also be applied as described in QVP 2.

In the same blue oval where the selected tag is located, there should be a white "X" button on the right. If the user clicks this button, they will get rid of this certain filter (tag).

For example, if the "Research" tag is chosen by the user, it should display "Research" next to the filter chosen (which in this case is "Top") along with the "X" button. This will allow only question boxes that include "Research" as one of its tags to be displayed from the highest to lowest number of upvotes.

If the user clicks the "X" button, all questions are shown from highest to lowest number of upvotes since no other filter is selected.

Tag Screens: TSA (might make this into search by typing feature instead)

These screens go into great detail regarding the tags that can be selected to search for a question.

TS 1: Filter by Tag

When the user clicks the "By Tag" option from QVP 2, it leads to this screen, which shows the different tags the user can pick in order to filter the question boxes on QVP 1.

QVP 1, at 20% opacity, is on the background of this screen. The only components from QVP 1 that stay at 100% opacity are the title bar and the navigation bar.

The cancel button (the "X" button in the top left corner of the screen) and the tags the user can select are displayed, along with the top bar and the navigation bar, at 100% opacity.

The tags that should be displayed are "MCAT", "Scholarships", "Courses", "Financial Aid", "Application Tips", "Specialties", "Research", "Extracurriculars", "Service Learning", "Interview Tips", and "Other".

The statement "More Medical Exams Coming Soon!" should be displayed to the right of the "MCAT" button and connected by an asterisk as seen on the screen.

In order to differentiate the categories, each tag has a different color as shown on the screen.

When a user clicks a tag, the blue oval with the tag name remains at 100% opacity while all other options change to 75% opacity. If the user selects a second (or multiple) tag, that option should change from 75% to 100% opacity. If no options are selected, all the tag options should be displayed at 100% opacity.

When the user clicks a selected tag another time, the opacity should change from 100% to 75%. This means that the user unselected the tag.

When the user selects a tag, a copy of the button with the specified tag appear on top of the list of tags and to the right of the cancel button. This copy is not a button and cannot be clicked; it just shows the user the tag option they chose. An example is shown in TS 4.

If multiple tags are selected by the user, copies of the buttons should all show up on the line on top of the list of tags and to the right of the cancel button. If needed, the user should have the ability to scroll sideways on this line to see all the tags selected. This should only remain on one line.

If the user unselects a tag, the copy of the tag should disappear from this line.

When the user clicks the cancel button, all tags displayed on this line should be saved and added to QVP 1 as shown in QVP 3.

Clicking the "Courses" or "Specialties" tags lead to screens TS 2 and TS 3, respectively.

A copy of the "Courses" or "Specialties" button should not show up on the line on top of the list of tags. Instead, they lead to their respective screens and their subsections of tags will be displayed once the user comes back to TS 1.

When the user chooses the cancel button (the "X" button in the top left corner of the screen), the tags that the user chose (the copy of the buttons on the top of the screen or the buttons with 100% opacity) will be displayed on QVP 1 as shown in QVP 3.

The user should have the ability to select multiple tags, so it is an important function to save all the tags the user selects and then display them along with the filter the user selected.

TS 2: Expansion of Tags

When the user clicks the "Courses" button on TS 1, it leads to this screen, which shows more tags that can be selected and displayed on QVP 1 as shown in QVP 3.

QVP 1 is still displayed in the background, but the opacity of this screen changes from 100% to 20%. The navigation bar and the title bar still remain at 100% opacity. The "Go Back" button and the tags the user can select are displayed, along with the top bar and the navigation bar, at 100% opacity.

The "Courses" button will be displayed on the center of the left side of the screen. The user should not be able to click this button. Its only purpose is to show the user that they are on the "Courses" subsection of tags.

The right side of the screen displays tags the user can choose. These tags include "All Courses", "Biology", "General Chemistry", "Organic Chemistry", "Physics", "English", "Calculus", "Statistics", "Biochemistry", and "Other Courses".

It should be noted that each tag button has the same color, unlike the different colors on TS 1, in order to visually show the user that these tags fall under the "Courses" category.

Unlike the TS 1 screen, the top left corner contains a "Go Back" button represented by a left facing arrow. This shows users that clicking this button would lead back to TS 1, which contains the general tag options.

When a user clicks a tag, the blue oval with the tag name remains at 100% opacity while all other options change to 75% opacity. If the user selects a second (or multiple) tag, that option should change from 75% to 100% opacity. If no options are selected, all the tag options should be displayed at 100% opacity.

When the user clicks a selected tag another time, the opacity should change from 100% to 75%. This means that the user unselected the tag.

When the user selects a tag, a copy of the button with the specified tag appear on top of the list of tags and to the right of the "Go Back" button. This copy is not a button and cannot be clicked; it just shows the user the tag option they chose. An example is shown in TS 4.

If multiple tags are selected by the user, copies of the buttons should all show up on the line on top of the list of tags and to the right of the "Go Back" button. If needed, the user should have the ability to scroll sideways on this line to see all the tags selected. This should only remain on one line.

If the user unselects a tag, the copy of the tag should disappear as well.

When the user clicks the "Go Back" button, all tags displayed on this line should be saved and added to the similar line of tags on TS 1.

TS 3: Expansion of Tags II

When the user clicks the "Specialties" button on TS 1, it leads to this screen, which shows more tags that can be selected and displayed on QVP 1 as shown in QVP 3.

QVP 1 is still displayed in the background, but the opacity of this screen changes from 100% to 20%. The navigation bar and the title bar still remain at 100% opacity. The "Go Back" button and the tags the user can select are displayed, along with the top bar and the navigation bar, at 100% opacity.

The "Specialties" button will be displayed on the center of the left side of the screen. The user should not be able to click this button. Its only purpose is to show the user that they are on the "Specialties" subsection of tags.

The right side of the screen displays tags the user can choose. These tags include "All Specialties", "Internal Medicine", "Pediatrics", "Dermatology", "Gastroenterology", "Orthopedics", "OB/GYN", "Neurology", "Anesthesiology", "Cardiology", "Radiology", "Psychiatry", "Ophthalmology", "Immunology", "General Surgery", and "Other Specialties".

It should be noted that each tag button has the same color, unlike the different colors on TS 1, in order to visually show the user that these tags fall under the "Specialties" category.

Unlike the TS 1 screen, the top left corner contains a "Go Back" button represented by a left facing arrow. This shows users that clicking this button would lead back to TS 1, which contains the general tag options.

When a user clicks a tag, the blue oval with the tag name remains at 100% opacity while all other options change to 75% opacity. If the user selects a second (or multiple) tag, that option should change from 75% to 100% opacity. If no options are selected, all the tag options should be displayed at 100% opacity.

When the user clicks a selected tag another time, the opacity should change from 100% to 75%. This means that the user unselected the tag.

When the user selects a tag, a copy of the button with the specified tag appear on top of the list of tags and to the right of the "Go Back" button. This copy is not a button and cannot be clicked; it just shows the user the tag option they chose. An example is shown in TS 4.

If multiple tags are selected by the user, copies of the buttons should all show up on the line on top of the list of tags and to the right of the "Go Back" button. If needed, the user should have the ability to scroll sideways on this line to see all the tags selected. This should only remain on one line.

If the user unselects a tag, the copy of the tag should disappear as well.

When the user clicks the "Go Back" button, all tags displayed on this line should be saved and added to the similar line of tags on TS 1.

TS 4: Tag Selection

This screen is an example of how selected tags look like on TS 1. The specifics of selecting, unselecting, showing, and using tags are explained in TS 1, TS 2, TS 3, and QVP 3.

It is important to remember that clicking the "Courses" or "Specialties" buttons lead to TS 2 and TS 3, respectively, and a copy of these buttons will not show on the line next to the "X" button on TS 1. Instead, any subtag selected will appear on this line (on TS 1 screen) and on QVP 1 as shown in QVP 3.

The "Go Back" button on TS 2 and TS 3 saves any choices from these screens and includes it to the line on top of TS 1. The line next to the "X" button on TS 1 is the final selection of tags by the user.

Clicking the "X" button on TS 1 leads to QVP 1 with the line of tags displayed next to the blue oval containing the selected filter. This is explained in more detail on QVP 3.

For example, if the "Research" and "Financial Aid" tags are chosen by the user, those specific tag buttons should be at 100% opacity while all other buttons are at 75% opacity. Also, a copy of these buttons are displayed on the line on top of the list of tags.

In this example, scrolling is not necessary, since these two tags fit on the line, but if more tags are selected or they do not fit, the user can scroll sideways on this line to see more selected tags.

Once the user clicks the "X" button, the tags selected (the tags at 100% opacity or the tags on the line next to the "X" button) will be displayed on QVP 1 as shown on QVP 3.

Posting a Question: PAQ

These screens show the process of posting a question in the Mentor Forum. Features include typing in your question, adding additional comments/attachments, adding tags, etc.

PAQ 1: Posting Question

Clicking the plus button on the bottom right of QVP 1 leads to this screen. On this screen, the user can post a question, select tags related to the question, and add any extra details.

Under the title bar is a box that includes the search symbol on the far left followed by the phrase "What is your question?" in blue letters When the user clicks the box, the phrase disappears and a keyboard appears, allowing the user to type out their question. If the question does not fit into this box, the box should expand, so the writer can see the entirety of the question.

After the writer types the question and removes the keyboard, the box should return to its original shape, and if the question does not fit, the writer can scroll sideways in the box to see the full question.

Another box is located under the question box that states the phrase "Add any additional comments and details here (optional)" in grey letters. In this box, the writer of the question can offer any additional information to support their question.

When the user clicks the box, the phrase disappears and a keyboard appears, allowing the user to type any additional details. If the comments or details do not fit into this box, the writer should be able to scroll up and down to see the entirety of their comment.

The bottom right corner of this box contains a paperclip icon. When the writer of the question clicks on this icon, they will have the ability to attach any documents, PDFs, etc. that they believe will support the question.

Under the details box is the phrase "Choose any of the following tags:" followed by a blue oval with the word "Tags" centered in white letters. Clicking this "Tags" button will lead to PAQ 2.

This and the following actions are similar to the TS screens and how tags are displayed onto QVP 1.

Once the user exits out of PAQ 2 by clicking the "X" button in the top left corner of the screen, the tags saved by the app will be displayed in the box labelled "Tags Chosen:", which is located under the "Tags" button.

When the saved tags are shown in the "Tags Chosen:", they look exactly like the buttons from PAQ 2, 3, and 4. However, in the same blue oval where the selected tag is located, there should be a white "X" button on the right. If the writer clicks this button, they will get rid of this certain tag. An example of how the buttons should look like is shown on QVP 3.

After the "Tags" button and boxes, the phrase "Would you like to post anonymously?" is centered with black letters. Two blue circles with the two options, "Yes" and "No" follow under the phrase.

To answer this question, the user must select either the circle preceding the word "Yes" or the one preceding the word "No". When the writer selects a circle, it changes from a white circle with a blue border to a fully blue circle. If the user clicks one option, but then clicks the other option, the first option's circle returns back to a white circle with a blue border, while the second option's circle changes to a fully blue circle. The user cannot select both options.

If the writer chooses the "Yes" circle, on the AAC screens, the profile picture of the writer will be the generic image (as shown in the AAC screens) and in replacement of the phrase "Question Asker" will be the word "Anonymous". The credentials of the user will be shown under "Anonymous" as shown in the AAC screens.

If the writer chooses the "No" circle, on the AAC screens, the profile picture of the writer will be the user's profile picture, and in replacement of "Question Asker" will be the writer's name. The credentials of the user will be shown under the writer's name as shown in the AAC screens.

At the end of the screen are two buttons labelled "Submit" and "Cancel". The buttons are blue ovals filled with white centered lettering and an icon on the left. The "Submit" button's icon is a check mark followed with the word "Submit". The "Cancel" button's icon is a "X" followed with the word "Cancel".

In order to click the "Submit" button and post the question, the writer must at least type one letter in the question box and click an option to the "Anonymous" question. The Details and Tags boxes are optional. If the user does not complete these requirements, the "Submit" button should be 75% opaque and unable to be clicked, which will show the user that submission will not be allowed. Once the requirements are reached, the button should turn 100% opaque and clickable. Once the user clicks this button, the question will be posted onto the Mentor Forum.

Unlike the "Submit" button, the Cancel button will always be 100% opaque and clickable, so if the user doesn't want to post a question anymore, they can leave this screen. Clicking the "Cancel" button leads back to QVP 1.

PAQ 2: Tag Selection for Question

When the user clicks the "By Tag" option from QVP 2, it leads to this screen, which shows the different tags the user can pick in order to filter the question boxes on QVP 1.

QVP 1, at 20% opacity, is on the background of this screen. The only components from QVP 1 that stay at 100% opacity are the title bar and the navigation bar.

The cancel button (the "X" button in the top left corner of the screen) and the tags the user can select are displayed, along with the top bar and the navigation bar, at 100% opacity.

The tags that should be displayed are "MCAT", "Scholarships", "Courses", "Financial Aid", "Application Tips", "Specialties", "Research", "Extracurriculars", "Service Learning", "Interview Tips", and "Other".

The statement "More Medical Exams Coming Soon!" should be displayed to the right of the "MCAT" button and connected by an asterisk as seen on the screen.

In order to differentiate the categories, each tag has a different color as shown on the screen.

When a user clicks a tag, the blue oval with the tag name remains at 100% opacity while all other options change to 75% opacity. If the user selects a second (or multiple) tag, that option should change from 75% to 100% opacity. If no options are selected, all the tag options should be displayed at 100% opacity.

When the user clicks a selected tag another time, the opacity should change from 100% to 75%. This means that the user unselected the tag.

When the user selects a tag, a copy of the button with the specified tag appear on top of the list of tags and to the right of the cancel button. This copy is not a button and cannot be clicked; it just shows the user the tag option they chose. An example is shown in TS 4.

If multiple tags are selected by the user, copies of the buttons should all show up on the line on top of the list of tags and to the right of the cancel button. If needed, the user should have the ability to scroll sideways on this line to see all the tags selected. This should only remain on one line.

If the user unselects a tag, the copy of the tag should disappear from this line.

When the user clicks the cancel button, all tags displayed on this line should be saved and added to QVP 1 as shown in QVP 3.

Clicking the "Courses" or "Specialties" tags lead to screens TS 2 and TS 3, respectively.

A copy of the "Courses" or "Specialties" button should not show up on the line on top of the list of tags. Instead, they lead to their respective screens and their subsections of tags will be displayed once the user comes back to TS 1.

When the user chooses the cancel button (the "X" button in the top left corner of the screen), the tags that the user chose (the copy of the buttons on the top of the screen or the buttons with 100% opacity) will be displayed on QVP 1 as shown in QVP 3.

The user should have the ability to select multiple tags, so it is an important function to save all the tags the user selects and then display them along with the filter the user selected.

PAQ 3: Tag Expansion for Question

When the user clicks the "Courses" button on TS 1, it leads to this screen, which shows more tags that can be selected and displayed on QVP 1 as shown in QVP 3.

QVP 1 is still displayed in the background, but the opacity of this screen changes from 100% to 20%. The navigation bar and the title bar still remain at 100% opacity. The "Go Back" button and the tags the user can select are displayed, along with the top bar and the navigation bar, at 100% opacity.

The "Courses" button will be displayed on the center of the left side of the screen. The user should not be able to click this button. Its only purpose is to show the user that they are on the "Courses" subsection of tags.

The right side of the screen displays tags the user can choose. These tags include "All Courses", "Biology", "General Chemistry", "Organic Chemistry", "Physics", "English", "Calculus", "Statistics", "Biochemistry", and "Other Courses".

It should be noted that each tag button has the same color, unlike the different colors on TS 1, in order to visually show the user that these tags fall under the "Courses" category.

Unlike the TS 1 screen, the top left corner contains a "Go Back" button represented by a left facing arrow. This shows users that clicking this button would lead back to TS 1, which contains the general tag options.

When a user clicks a tag, the blue oval with the tag name remains at 100% opacity while all other options change to 75% opacity. If the user selects a second (or multiple) tag, that option should change from 75% to 100% opacity. If no options are selected, all the tag options should be displayed at 100% opacity.

When the user clicks a selected tag another time, the opacity should change from 100% to 75%. This means that the user unselected the tag.

When the user selects a tag, a copy of the button with the specified tag appears on top of the list of tags and to the right of the "Go Back" button. This copy is not a button and cannot be clicked; it just shows the user the tag option they chose. An example is shown in TS 4.

If multiple tags are selected by the user, copies of the buttons should all show up on the line on top of the list of tags and to the right of the "Go Back" button. If needed, the user should have the ability to scroll sideways on this line to see all the tags selected. This should only remain on one line.

If the user unselects a tag, the copy of the tag should disappear as well.

When the user clicks the "Go Back" button, all tags displayed on this line should be saved and added to the similar line of tags on TS 1.

PAQ 4: Tag Expansion for Question II

When the user clicks the "Specialties" button on TS 1, it leads to this screen, which shows more tags that can be selected and displayed on QVP 1 as shown in QVP 3.

QVP 1 is still displayed in the background, but the opacity of this screen changes from 100% to 20%. The navigation bar and the title bar still remain at 100% opacity. The "Go Back" button and the tags the user can select are displayed, along with the top bar and the navigation bar, at 100% opacity.

The "Specialties" button will be displayed on the center of the left side of the screen. The user should not be able to click this button. Its only purpose is to show the user that they are on the "Specialties" subsection of tags.

The right side of the screen displays tags the user can choose. These tags include "All Specialties", "Internal Medicine", "Pediatrics", "Dermatology", "Gastroenterology", "Orthopedics", "OB/GYN", "Neurology", "Anesthesiology", "Cardiology", "Radiology", "Psychiatry", "Ophthalmology", "Immunology", "General Surgery", and "Other Specialties".

It should be noted that each tag button has the same color, unlike the different colors on TS 1, in order to visually show the user that these tags fall under the "Specialties" category.

Unlike the TS 1 screen, the top left corner contains a "Go Back" button represented by a left facing arrow. This shows users that clicking this button would lead back to TS 1, which contains the general tag options.

When a user clicks a tag, the blue oval with the tag name remains at 100% opacity while all other options change to 75% opacity. If the user selects a second (or multiple) tag, that option should change from 75% to 100% opacity. If no options are selected, all the tag options should be displayed at 100% opacity.

When the user clicks a selected tag another time, the opacity should change from 100% to 75%. This means that the user unselected the tag.

When the user selects a tag, a copy of the button with the specified tag appears on top of the list of tags and to the right of the "Go Back" button. This copy is not a button and cannot be clicked; it just shows the user the tag option they chose. An example is shown in TS 4.

If multiple tags are selected by the user, copies of the buttons should all show up on the line on top of the list of tags and to the right of the "Go Back" button. If needed, the user should have the ability to scroll sideways on this line to see all the tags selected. This should only remain on one line.

If the user unselects a tag, the copy of the tag should disappear as well.

When the user clicks the "Go Back" button, all tags displayed on this line should be saved and added to the similar line of tags on TS 1.

Answers and Comments: AAC

These screens develop the screens of a question and its answers, providing the user with options to manipulate the answers of a question as well as potentially comment/answer themselves.

AAC 1: Individual Question/Answer Page

Clicking a question box on QVP 1 leads to this screen, which shows the specific question, extra details (optional), and answers.

Displaying the question on these screens is similar to the question boxes, since these screens are just an expansion of the question boxes on QVP 1.

This screen begins with the entirety of the first question. This is copied from the question box on PAQ 1.

The tags the writer of the question selected from the PAQ screens are directly under the question. This is copied from the Tag box on PAQ 1. If needed, the user should be able to scroll sideways on this line to fully see all the tags selected.

Under the tags are the optional additional details or comments the writer of the question included in order to better explain the question. This is copied from the details box on PAQ 1. Any attachments would also appear in this area. These should show in grey letters.

Upvotes are shown in the top left corner, next to the question. This is represented by an arrow and a number (under the arrow). The user should be able to click the arrow to upvote the question, and the number under it represents the amount of upvotes the question received.

The profile of the writer is located on the bottom left of the question box. This includes the profile picture with the writer's name under it. Under the name is the writer's credentials such as Medical Student First Year.

The profile picture and name of the writer will only appear if they select the "No" option on PAQ 1.

AAC 2 shows how the question will be displayed when the writer selects the "Yes" option on PAQ 1.

Under the entirety of displaying the question (including details, profile, tags, and upvotes) will be a black dividing line, which separates the question and any accompanying answers.

Under the line is the "Filters" drop down box, which filters the answers by either "Top", "New", or "Old". The user can only select one of these options. The default filter, which will be selected if the user does not pick a filter, is "Top". This box will be explained more on AAC 4.

The answer boxes follow the "Filters" drop down box, and display the answer, profile of the answerer, upvotes, and the date the answer was posted.

Upvotes are shown in the top left corner, next to the answer. This is represented by an arrow and a number (under the arrow). The user should be able to click the arrow to upvote the answer, and the number under it represents the amount of upvotes the answer received. The question with the most upvotes has a star on the left of the upvotes to represent that it is the "Top Answer". The star should never leave the question with the most upvotes even if the user cannot see that answer box on their screen.

The profile of the answerer is located on the bottom left of the question box. This includes the profile picture with the answerer's name under it. Under the name is the answerer's credentials such as Practicing Physician. The answerer does not have an "Anonymous" option.

On the right of the upvotes and profile is the exact answer the answerer typed in the box at the bottom of the screen.

In the right corner, the date or time that the answer was posted is shown. This is shown in order to filter the question either by "New" or "Old".

Next to the date is an "Expand/Collapse" option, which will be explained and shown in later screens and explanations.

Each answer box is the exact same shape and size. Therefore, if the answer is larger than the box, the amount of the answer that can fit in the box will be displayed followed by an ellipsis. If the user wants to continue reading the answer, clicking the box will lead to an expanded box with the entirety of the answer.

After the date, each answer box has an "Expand/Collapse" option in the bottom right corner, which will help the user organize the answers.

If the answer is expanded, the user can click "Collapse" to cause the answer to disappear and only the name and qualifications show. This is shown on AAC 3.

If the answer is collapsed, the user can click "Expand" to cause the box to change back to its default, which is shown on this screen already.

The last item on the screen is a grey box at the bottom of the screen with a pencil icon on the left followed by the phrase "Type here to answer the question."

If the user clicks on this box, the phrase disappears and a keyboard comes up, allowing the user to type an answer.

It should be noted that the answerer doesn't have an anonymous option because they are responsible for their own answer.

AAC 2: AAC 1 for Anonymous Answers

This screen is an example of how the profile of the writer will appear if they click the "Yes" option to the "Anonymous" question on PAQ 1. All components of the screen will remain the same except for the profile of the writer, so if further explanations are needed for the other components, refer to the AAC 1 explanations.

The profile of the writer is located in the bottom left corner of the question area of the screen (before the dividing line).

If the user clicks the "No" option to the "Anonymous" question on PAQ 1, refer to the explanation on AAC 1 and AAC 1 to see how that will appear.

If the user clicks "Yes" option, the profile picture of the writer will be the generic image, as shown in this screen, and in replacement of the writer's name will be the word "Anonymous". The credentials of the user will be shown under "Anonymous".

AAC 3: Collapsed Answers

This screen is an example of what clicking the "Collapse" option on the bottom right corner of the answer boxes will do to the boxes and answers. The other components of the screen are the same, so if further explanations are needed on those, refer to the explanations in AAC 1.

After the date, each answer box has an "Expand/Collapse" option in the bottom right corner, which will help the user organize the answers.

If the answer is expanded, the user can click "Collapse" to cause the answer to disappear and only the name and qualifications show. This is shown on this screen.

If the answer is collapsed, the user can click "Expand" to cause the box to change back to its default, which is shown on AAC 1.

When the user clicks "Collapse" on AAC 1, the answer box changes to a long skinny rectangle containing only the answerer's name, credentials, and an "Expand" option.

As seen in this screen, it is important to note that the star, which represents "Top Answer" will still be shown in the collapsed version of the answer boxes.

The left side contains the name with the qualifications under it.

The right hand side contains the word "Expand", which when clicked will lead to the regular answer boxes as shown in AAC 1.

AAC 4: Filter/Sort Answers

This screen appears when clicking the "Filters" drop down box on AAC 1. It shows the filters the user may select to organize the question's answers.

This screen is similar to QVP 2, except instead of filtering questions, it filters the answers to one specific question.

When the "Filters" box is clicked, the opacity of the screen after the dividing line, which separates the question and answers, changes from 100% to 30% in order to see the filter options.

Everything before the dividing line, the "Filters" drop down box, and the options will remain at 100% opacity.

The filter options of "Top", "New", and "Old" appear on the right side of the "Filters" box. The user should not be able to choose more than one of these options.

If the user picks the "Top" option, the screen changes back to AAC 1 with the word "Top" in the blue oval next to the "Filters" drop down box. The answers are then rearranged in the order where the questions are shown from the most to least upvotes.

If the user picks the "New" option, the screen changes back to AAC 1 with the word "New" in the blue oval next to the "Filters" drop down box. The answers are then rearranged in the order where the questions are shown from the newest to oldest posted question.

If the user picks the "Old" option, the screen changes back to AAC 1 with the word "Old" in the blue oval next to the "Filters" drop down box. The answers are then rearranged in the order where the questions are shown from the oldest to the newest posted question.

The default filter is "Top", so even if the user does not pick a filter, the answers should be displayed from most upvotes to least upvotes with the word "Top" in the blue oval next to the "Filters" box.

The star, which represents the Top Answer (answer with the most upvotes), will always be displayed on the Top Answer, even if it doesn't remain the first answer shown when changing the filter.

SECTION 5: Profile

Profile: PRF

Profile Fields (i)=i in circle for "More Information"

Come up as a pop-up

Basic info at top

Profile picture (placeholder is, for example, a caduceus)

Click on it to upload from photo library

Name

Education level (entered from "I am a . . . ")

Current Institute (chosen upon entering app)

Other categories (below is not required, only a plus to get personalized resources)

Demographics

Gender (from log in) (drop down)

Male, female, other

First-generation Student? (check for yes) (i)

(i) First-generation college students are those whose parent(s)/legal guardian(s) have not completed a bachelor's degree. These students are the first in their family to attend a four-year college/university.

Race/Ethnicity (check all that apply—appears listed with commas)

American Indian or Alaskan Native

Asian

Black or African American

Hispanic/Latinx

Native Hawaiian or Other Pacific Islander

White

Elaborate on your racial/ethnic/cultural background. (i)

Long answer text (i) If you feel that there are certain aspects of your racial, ethnic, and/or cultural background that have played a significant role in or had a significant impact on your upbringing, education, social or home life, etc. and are not fully expressed through your previous answers, please elaborate here.

Sexuality?

Contact

Email (fill in)

Phone Number (fill in)

Educational Interests

Major (fill in, user can click on small plus button to add more fields, appears listed with commas)

Minor (fill in, user can click on small plus button to add more fields, appears listed with commas)
Track (check all that apply—appears listed with commas)
　Pre-Health, Pre-Law, Pre-Business, Pre-Engineering
　Health-Profession/Degree of Interest
　　Allopathic Medicine (M.D)
　　Osteopathic (D.O) Medicine
　　Master's Degree
　　PhD
　　Dentistry (D.M.D and D.D.S)
　　Optometry (0.D)
　　Physician Assistant
　　Pediatric Medicine (D.P.M)
　　Nursing (CNA, LPN, RN, APRN)
　　Veterinary Medicine (D.V.M)
STEM Extracurriculars (i)
　The following options show up with boxes next to them that can be checked. If the user checks the box, then short answer box(es) pop(s) up underneath it. The gray words inside the short answer box(es) are listed under each category.
　Shadowing
　　"Specialty"
　Internships
　　"Role"
　　"Location/Institution"
　Research
　　"Field"
　　"Research Site"
　Clinical Volunteer
　　"Volunteer Site"
　STEM Student Organizations
　　"List club names separated by commas"
Outside Interests (i)
　(i) As concisely as possible, please list any non-STEM extracurricular involvements.
　Long answer box
　　"List club names separated by commas"

All patents and publications mentioned in this specification are indicative of the levels of those of ordinary skill in the art to which the invention pertains. All patents and publications are herein incorporated by reference to the same extent as if each individual publication was specifically and individually indicated to be incorporated by reference.

As will be appreciated by one of ordinary skill in the art, in view of the discussions herein, aspects of the present invention may be embodied as a system, method, or computer program product.

Accordingly, one or more aspects of the present invention may take the form of an entire hardware embodiment, an entire software embodiment (including firmware, resident software, micro-code, etc.), or an embodiment combining software and hardware aspects that may all generally be referred to herein as a "circuit", "module", or "system". Furthermore, parts of the present invention may take the form of a computer program product embodied in one or more computer-readable medium(s) having the computer readable program code embodied thereon.

An information processing system 1200 may utilize any combination of computer-readable medium(s). The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the preceding.

More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the preceding. In the context of this document, a computer-readable storage medium may be any tangible medium that can contain or store a program for use by or in connection with an instruction execution system, apparatus, or device.

A computer-readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium, and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the preceding. Computer program code for carrying out operations for aspects of the present invention may be written in any combination of one or more programming languages, including an object-oriented programming language such as Java, C++, or the like, and conventional procedural programming languages, such as the "C" programming language or similar programming languages. According to various embodiments of the invention, the program code may execute entirely on a user's computer, partly on a user's computer, as a stand-alone software package, partly on a user's computer and partly on a remote computer or entirely on a remote computer or a server. In the latter scenario, the remote computer or the server may be connected to the user's computer through any type of network, including one or more of a local area network (LAN), a wireless communication network, a wide area network (WAN), or a connection may be made to an external computer (for example, through the Internet using an Internet Service Provider).

Aspects of the present invention have been discussed above with reference to flow diagram illustrations and/or block diagrams of methods, apparatus (systems), and computer program products according to various embodiments of the invention. It will be understood that each block of the flow diagram illustrations and/or block diagrams, and combinations of blocks in the flow diagram illustrations and in the block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices, to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices, to cause operational steps to be performed on the computer, other programmable apparatus, or other devices, to produce a computer-implemented process (or method) such that the computer instructions which execute on the computer or other programmable apparatus provide processes for implementing the functions/acts specified in the flowchart and/or block diagram block or blocks.

The terminology used herein is to describe particular embodiments only and is not intended to be limiting of the invention.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "a" or "an," as used herein, are defined as one or more than one. The term plurality, as used herein, is defined as two or more than two. The term another, as used herein, is defined as at least a second or more. The terms "including" and "having", as used herein, are defined as comprising (i.e., open language). The term "coupled", as used herein, is defined as "connected," although not necessarily directly and not necessarily mechanically. The term "configured to" describes the hardware, software, or a combination of hardware and software that is adapted to, set up, arranged, built, composed, constructed, designed, or that has any combination of these characteristics to carry out a given function. The term "adapted to" describes the hardware, software, or a combination of hardware and software, capable of performing, or able to accommodate the performance of, that is suitable to perform a given function, or that has any combination of the characteristics mentioned above to perform a given function.

The description of the present invention has been presented for purposes of illustration and description but is not intended to be exhaustive or limited to the invention in the form disclosed. Many modifications and variations will be apparent to those of ordinary skill in the art without departing from the scope of the invention. Each embodiment was chosen and described in order to best explain the principles of the invention and the practical application and to enable others of ordinary skill in the art to understand the invention for various embodiments with various modifications as are suited to the particular use contemplated. Accordingly, the systems and methods for mentoring students and facilitating their entry into healthcare professions described herein are presently representative of various embodiments, are intended to be example embodiments, and are not intended as limitations on the scope.

Furthermore, the illustrations of embodiments described herein are intended to provide a general understanding of the structure and operation of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized.

Accordingly, the specification and drawings are to be regarded in an illustrative rather than a restrictive sense. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of ordinary skill in the art upon reviewing the above description. Therefore, it is intended that the disclosure not be limited to the particular embodiment(s) disclosed as the best mode contemplated for carrying out this invention, but that the invention will include all embodiments falling within the scope of the appended claims.

What is claimed is:

1. A computer-implemented method for mentoring students for entry into a healthcare profession, comprising:
   a) providing a smartphone mobile platform application ("the app") for exchanging information ("the data") between one or more individual student users using respective one or more remote user devices communicatively coupled through a network connection, and one or more server information processing systems ("the server");
   b) persisting the data in one or more databases ("the database") accessible by the server, the data being stored in one or more databases, the data being accessible using the app so that the data can be updated in real time through a graphical user interface of the app running on the respective one or more remote user devices;
   c) the app providing a task interface that (i) displays, at each particular remote user device associated with a student user selected from the one or more individual student users, predefined tasks, which are persisted in the database, to be completed by the student user and that are relevant to entry into the healthcare profession, and (ii) displays, at the particular remote user device, a check-off interface, with which the student user can indicate completion of predefined tasks, the checked-off state of tasks being persisted in the database, the task information forming part of the data;
   d) the app providing a pathway interface that (i) displays, at a particular remote user device associated with a student user selected from the one or more individual student users, a curvilinear pathway which includes markings corresponding to tasks remaining to be completed and checked-off in the check-off interface by the student user, the markings are displayed spaced apart along the curvilinear pathway and filling the curvilinear pathway from a marking that corresponds to a next task to be completed to a marking in the curvilinear pathway indicating completion and check-off of all tasks in the check-off interface, and (ii) displays, at the particular remote user device, a user's completion status icon displayed in close proximity to at least one of 1) a marking that corresponds to a next task to be completed, or 2) a marking in the curvilinear pathway indicating completion and check-off of all tasks;

e) detecting, at the check-off interface on a remote user device, an individual student user selecting one or more tasks and thereby changing the checked-off state of each selected task to either: 1) checked-off and completed or 2) un-checked and not completed, and in response the remote user device transmitting one or more messages to the server, which based on receiving the one or more messages updating the change of the checked-off state of the one or more tasks in the task information forming part of the data of the one or more tasks persisted in the database by the server; and f) the server, based on the updating the change of the checked-off state of the one or more tasks in the data, transmitting a message to the remote user device, which based on receiving the server transmitted message and displaying the pathway interface, the remote user device gamifying the displayed pathway interface as follows:
  i) animatedly moving the user's completion status icon forward along the displayed curvilinear pathway a number of markings equal to a net positive difference, or
  ii) animatedly moving the user's completion status icon backward along the displayed curvilinear pathway a number of markings equal to a net negative difference, between a first number of the one or more selected tasks having been changed state to checked-off and completed and a second number of the one or more selected tasks having been changed state to un-checked and not completed.

2. The method of claim 1, the data being a standard data format in the database through the use of schema driven querying service; and the data being stored in a custom data format in the one or more remote user devices based on compatibility of use and storage of the data in each one or more remote user devices.

3. The method of claim 2, wherein the server provides an Application Programming Interface ("API") for accessing the data in the standardized format.

4. The method of claim 1, wherein the data is persisted using an S3 style storage network.

5. The method of claim 1, wherein the server measures engagement by tracking a number of times the app has been downloaded.

6. The method of claim 1, wherein the server measures engagement by tracking a number of downloads of the app, a number of student users creating accounts, and a number of student users creating their own new tasks.

7. The method of claim 1, wherein the server is configured to scale dynamically to maintain real time exchange of information between a plurality of running instances of the app and the server as a number of running instances of the app increases.

8. The method of claim 1, wherein the app, in each of the one or more remote user devices, coordinating with the server to transmit alerts to selected one or more of the remote user devices which are associated with the respective one or more individual student users, the alerts relating to new information resources that are sources of information which is relevant to tasks an individual student user has completed, including displaying links to the new information resources, and at least a portion of the information sourced by the new information resource forming part of the data; and wherein the exchanged information includes information pertaining to a type of minority status of individual student users, and the new information resources are relevant to the type of minority status of individual student users.

9. The method of claim 8, wherein the new information resources include information relating to at least one of scholarships and aptitude testing relevant to the respective one or more individual student users using the app in the selected remote user devices.

10. The method of claim 1, wherein the markings are displayed as dots, each dot corresponding to either 1) a task remaining to be completed and checked-off in the check-off interface by the student user, or 2) a point in the curvilinear pathway indicating completion and check-off of all tasks in the check-off interface.

11. The method of claim 10, wherein the dots are displayed along the curvilinear pathway and equally spaced apart a distance between pairs of dots based on a number of dots filling the curvilinear pathway from a dot that corresponds to a next task to be completed to a dot in the curvilinear pathway indicating completion and check-off of all tasks in the check-off interface.

12. The method of claim 11, wherein based on adding a new task in the task check-off interface an additional dot is added to the dots displayed along the curvilinear pathway and equally spaced apart a distance between pairs of dots based on a number of dots filling the curvilinear pathway.

13. The method of claim 8, wherein the app includes a profile interface wherein individual computer users can exchange data relating to personal information and personal goals that is used by the server to customize the new information resources provided to the one or more individual student users using the respective selected one or more remote user devices.

14. A non-transitory computer-readable storage medium having stored therein instructions which, when executed by at least one hardware processor interoperating with computer memory, cause an information processing system comprising one or more servers communicatively coupled with one or more remote user devices over a communication network, to perform a computer-implemented method for mentoring students for entry into a healthcare profession, comprising:

a) providing a smartphone mobile platform application ("the app") for exchanging information ("the data") between one or more individual student users using respective one or more remote user devices communicatively coupled through a communication network connection, and one or more server information processing systems ("the server");

b) persisting the data in one or more databases ("the database") accessible by the server, the data being stored in one or more databases, the data being accessible using the app so that the data can be updated in real time through a graphical user interface of the app running on the respective one or more remote user devices;

c) the app providing a task interface that (i) displays, at each particular remote user device associated with a student user selected from the one or more individual student users, predefined tasks, which are persisted in the database, to be completed by the student user and that are relevant to entry into the healthcare profession, and (ii) displays, at the particular remote user device, a check-off interface, with which the student user can indicate completion of predefined tasks, the checked-off state of tasks being persisted in the database, the task information forming part of the data;

d) the app providing a pathway interface that (i) displays, at a particular remote user device associated with a student user selected from the one or more individual student users, a curvilinear pathway which includes markings corresponding to tasks remaining to be completed and checked-off in the check-off interface by the student user, the markings are displayed spaced apart along the curvilinear pathway and filling the curvilinear pathway from a marking that corresponds to a next task to be completed to a marking in the curvilinear pathway indicating completion and check-off of all tasks in the check-off interface, and (ii) displays, at the particular remote user device, a user's completion status icon displayed in close proximity to at least one of 1) a marking that corresponds to a next task to be completed or 2) a marking in the curvilinear pathway indicating completion and check-off of all tasks;

e) detecting, at the check-off interface on a remote user device, an individual student user selecting one or more tasks and thereby changing the checked-off state of each selected task to either: 1) checked-off and completed or 2) un-checked and not completed, and in response the remote user device transmitting one or more messages to the server, which based on receiving the one or more messages updating the change of the checked-off state of the one or more tasks in the task information forming part of the data of the one or more tasks persisted in the database by the server; and f) the server, based on the updating the change of the checked-off state of the one or more tasks in the data, transmitting a message to the remote user device, which based on receiving the server transmitted message and displaying the pathway interface, the remote user device gamifying the displayed pathway interface as follows:

i) animatedly moving the user's completion status icon forward along the displayed curvilinear pathway a number of markings equal to a net positive difference, or ii) animatedly moving the user's completion status icon backward along the displayed curvilinear pathway a number of markings equal to a net negative difference, between a first number of the one or more selected tasks having been changed state to checked-off and completed and a second number of the one or more selected tasks having been changed state to un-checked and not completed.

15. The non-transitory computer-readable storage medium of claim 14, wherein the markings are displayed as dots, each dot corresponding to either 1) a task remaining to be completed and checked-off in the check-off interface by the student user, or 2) a point in the curvilinear pathway indicating completion and check-off of all tasks in the check-off interface; and wherein the dots are displayed along the curvilinear pathway and equally spaced apart a distance between pairs of dots based on a number of dots filling the curvilinear pathway from a dot that corresponds to a next task to be completed to a dot in the curvilinear pathway indicating completion and check-off of all tasks in the check-off interface.

* * * * *